(12) United States Patent
Norris et al.

(10) Patent No.: US 10,341,797 B2
(45) Date of Patent: *Jul. 2, 2019

(54) SMARTPHONE PROVIDES VOICE AS BINAURAL SOUND DURING A TELEPHONE CALL

(71) Applicants: Glen A. Norris, Tokyo (JP); Philip Scott Lyren, Hong Kong (CN)

(72) Inventors: Glen A. Norris, Tokyo (JP); Philip Scott Lyren, Hong Kong (CN)

(*) Notice: Subject to any disclaimer, the term of this patent is extended or adjusted under 35 U.S.C. 154(b) by 27 days.

This patent is subject to a terminal disclaimer.

(21) Appl. No.: 15/813,187

(22) Filed: Nov. 15, 2017

(65) Prior Publication Data

US 2018/0091925 A1    Mar. 29, 2018

Related U.S. Application Data

(63) Continuation of application No. 15/729,681, filed on Oct. 11, 2017, which is a continuation of application No. 15/728,527, filed on Oct. 10, 2017, now Pat. No. 9,918,178, which is a continuation of application No. 15/674,998, filed on Aug. 11, 2017, now Pat. No.
(Continued)

(51) Int. Cl.
| | | |
|---|---|---|
| H04S 1/00 | (2006.01) | |
| H04S 3/00 | (2006.01) | |
| H04R 5/027 | (2006.01) | |
| H04S 7/00 | (2006.01) | |
| H04M 1/60 | (2006.01) | |
| H04M 3/56 | (2006.01) | |
| H04R 5/033 | (2006.01) | |
| H04M 9/08 | (2006.01) | |
| H04R 5/04 | (2006.01) | |
| H04M 3/533 | (2006.01) | |
| H04M 1/725 | (2006.01) | |

(Continued)

(52) U.S. Cl.
CPC ............. *H04S 1/002* (2013.01); *H04M 1/605* (2013.01); *H04M 1/6033* (2013.01); *H04M 1/72572* (2013.01); *H04M 3/53366* (2013.01); *H04M 3/568* (2013.01); *H04M 9/085* (2013.01); *H04R 5/027* (2013.01); *H04R 5/033* (2013.01); *H04R 5/04* (2013.01); *H04S 1/007* (2013.01); *H04S 3/008* (2013.01); *H04S 7/303* (2013.01); *H04S 7/304* (2013.01); *G10L 21/028* (2013.01); *H04R 27/00* (2013.01); *H04R 2227/003* (2013.01); *H04S 7/305* (2013.01); *H04S 2400/01* (2013.01); *H04S 2400/11* (2013.01); *H04S 2400/15* (2013.01); *H04S 2420/01* (2013.01)

(58) Field of Classification Search
None
See application file for complete search history.

(56) References Cited

U.S. PATENT DOCUMENTS

| | | | | |
|---|---|---|---|---|
| 2002/0151996 A1* | 10/2002 | Wilcock | ................. | G06F 3/167 700/94 |
| 2002/0151997 A1* | 10/2002 | Wilcock | ............... | G11B 19/025 700/94 |

(Continued)

*Primary Examiner* — Qin Zhu

(57) ABSTRACT

A smartphone provides a voice of a person during a telephone call to a user of the smartphone in binaural sound. The smartphone stores HRTFs of the user, and a digital signal processor (DSP) processes the voice of the person with the HRTFs so the voice of the person externally localizes in the binaural sound at a sound localization point (SLP) that is in empty space one meter away from a head of the user.

18 Claims, 18 Drawing Sheets

Related U.S. Application Data 9,832,588, which is a continuation of application No. 15/674,960, filed on Aug. 11, 2017, now Pat. No. 9,813,836, which is a continuation of application No. 15/635,224, filed on Jun. 28, 2017, now Pat. No. 9,794,723, which is a continuation of application No. 15/610,640, filed on Jun. 1, 2017, now Pat. No. 9,769,584, which is a continuation of application No. 15/441,199, filed on Feb. 23, 2017, now Pat. No. 9,674,628, which is a continuation of application No. 15/430,549, filed on Feb. 13, 2017, now Pat. No. 9,681,245, which is a continuation of application No. 15/367,186, filed on Dec. 2, 2016, now Pat. No. 9,615,190, which is a continuation of application No. 15/259,072, filed on Sep. 8, 2016, now Pat. No. 9,532,159, which is a continuation of application No. 15/096,352, filed on Apr. 12, 2016, now Pat. No. 9,445,214, which is a continuation of application No. 15/011,563, filed on Jan. 31, 2016, now Pat. No. 9,344,544, which is a continuation of application No. 14/946,806, filed on Nov. 20, 2015, now Pat. No. 9,282,196, which is a continuation of application No. 14/311,532, filed on Jun. 23, 2014, now Pat. No. 9,226,090.

(51) Int. Cl.
*G10L 21/028* (2013.01)
*H04R 27/00* (2006.01)

(56) References Cited

U.S. PATENT DOCUMENTS

| | | | | |
|---|---|---|---|---|
| 2002/0154179 A1* | 10/2002 | Wilcock | .............. | G11B 19/025 715/716 |
| 2002/0156633 A1* | 10/2002 | Hickey | ............... | G11B 19/025 704/270 |
| 2003/0018477 A1* | 1/2003 | Hinde | ................. | G11B 19/025 704/273 |
| 2003/0095668 A1* | 5/2003 | Wilcock | .............. | G11B 19/025 381/56 |
| 2003/0095669 A1* | 5/2003 | Belrose | ............... | G11B 19/025 381/56 |
| 2006/0067548 A1* | 3/2006 | Slaney | .................. | H04S 1/002 381/303 |
| 2008/0056517 A1* | 3/2008 | Algazi | .................... | H04S 7/304 381/310 |
| 2008/0243278 A1* | 10/2008 | Dalton | ................... | H04S 7/304 700/94 |
| 2009/0052703 A1* | 2/2009 | Hammershoi | .......... | H04S 7/302 381/310 |
| 2009/0310802 A1* | 12/2009 | Zhang | .................... | H04S 7/302 381/300 |
| 2010/0290636 A1* | 11/2010 | Mao | ........................ | H04S 7/304 381/74 |
| 2011/0144779 A1* | 6/2011 | Janse | ................ | G11B 20/10009 700/94 |
| 2011/0299707 A1* | 12/2011 | Meyer | .................... | H04S 7/304 381/310 |
| 2013/0041648 A1* | 2/2013 | Osman | .................... | H04S 7/304 704/2 |
| 2013/0177166 A1* | 7/2013 | Agevik | ................... | H04S 1/005 381/74 |
| 2013/0202117 A1* | 8/2013 | Brungart | .................... | H04R 5/04 381/17 |
| 2014/0064526 A1* | 3/2014 | Otto | ......................... | H04S 5/00 381/300 |
| 2014/0198918 A1* | 7/2014 | Li | ............................. | H04S 7/30 381/26 |
| 2015/0003653 A1* | 1/2015 | Recker | ................... | H04R 25/40 381/315 |
| 2015/0289063 A1* | 10/2015 | Ma | ......................... | H04R 25/50 381/321 |
| 2015/0326966 A1* | 11/2015 | Mehra | ..................... | H04S 7/304 367/138 |

\* cited by examiner

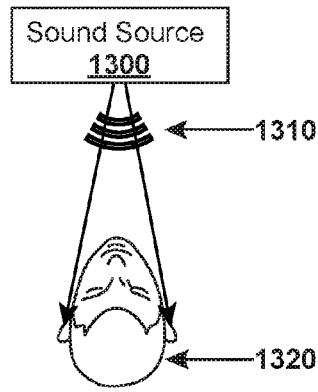 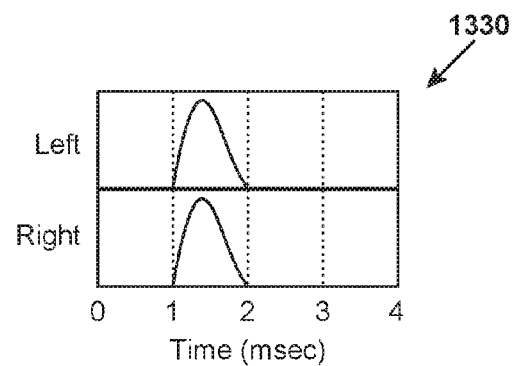
Figure 13A
Figure 13B
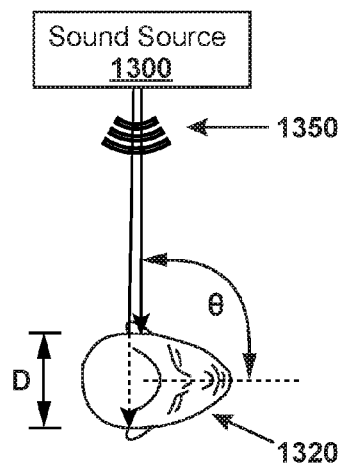 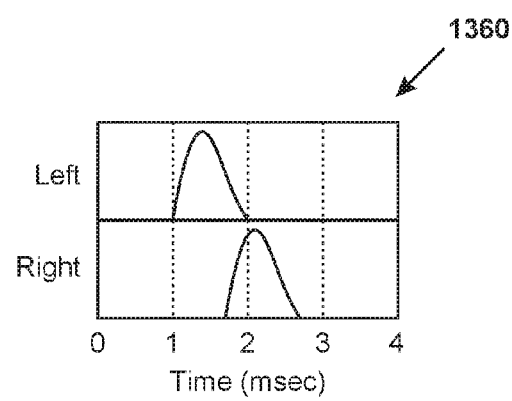
Figure 13C
Figure 13D

SMARTPHONE PROVIDES VOICE AS BINAURAL SOUND DURING A TELEPHONE CALL

BACKGROUND

Electronic devices typically provide monophonic or stereophonic sound to users. This sound has good speech intelligibility but is not equivalent to sound that the listeners would hear if they were proximate to a source of the sound. During a telephone call for example, listeners hear sound through a speaker in the electronic device or through headphones attached to the electronic device. This sound is not comparable in quality to sound that the listeners would hear if they were communicating face-to-face with each other.

BRIEF DESCRIPTION OF THE DRAWINGS

FIG. 13A shows a sound source providing a sound wave to a listener facing the sound source in accordance with an example embodiment.

FIG. 13B is a graph of a sound wave arriving at the listener in FIG. 13A in accordance with an example embodiment.

FIG. 13C shows the sound source providing a sound wave to the listener facing away at ninety degrees (90°) from the sound source in accordance with an example embodiment.

FIG. 13D is a graph of a sound wave arriving at the listener in FIG. 13C in accordance with an example embodiment.

SUMMARY OF THE INVENTION

One example embodiment is a computer system in which two electronic devices communicate with each other during a telephone call between two people. The computer system positions a voice of one person at a sound localization point that is proximate to the other person.

DETAILED DESCRIPTION

Example embodiments include systems, apparatus, and methods that provide a sound localization point (SLP) to a listener.

In order to determine a location of sound, humans process and compare monaural cues from each ear. This comparison reveals difference cues or binaural cues that enable sound localization. These cues include interaural time differences (ITDs), interaural level differences (ILDs), and head-related transfer functions (HRTFs). Cues thus result from changes to the sound wave from an interaction with the human anatomy. Humans process these changes as impulse responses or head-related impulse responses (HRIRs). Once the HRIRs for an individual are known, the associated or transformed HRTFs can be calculated. The HRIRs and transformed HRTFs enable sound to be convolved such that a location of the sound or sound localization point can be changed. A listener hears the convolved sound as if it had originated from the sound localization point.

Figure 1:
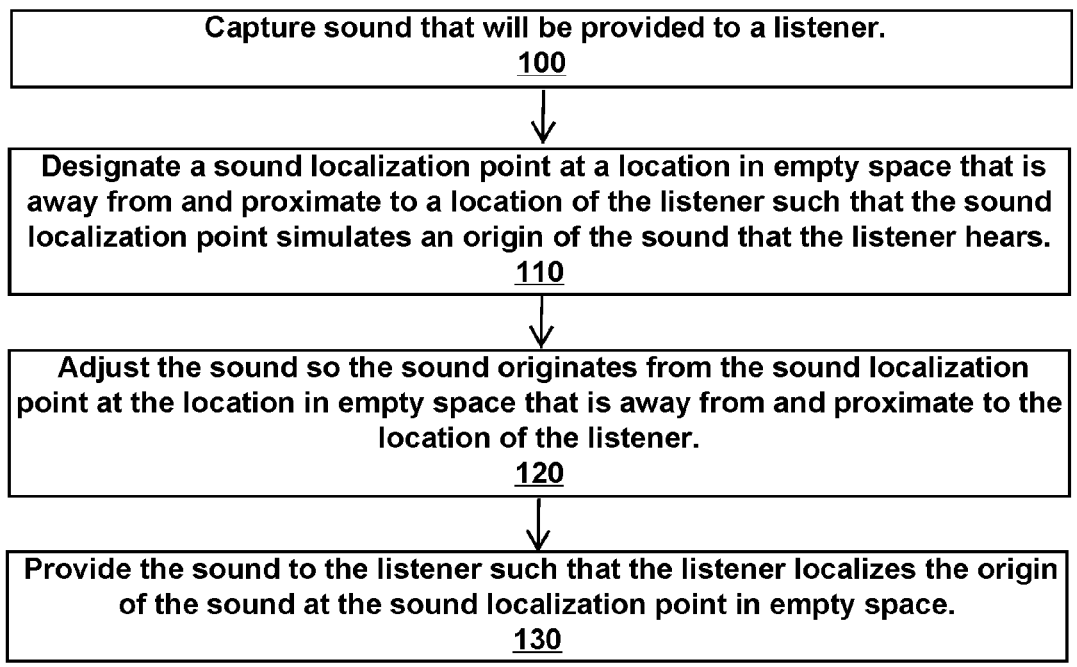
FIG. 1 is a method to provide sound that is localized at a sound localization point in accordance with an example embodiment.

FIG. 1 is a method to provide sound that is localized at a sound localization point.

Block 100 states capture sound that will be provided to a listener.

Different types of sound (such as monophonic, stereophonic, and binaural sound) can be received, recorded, stored, augmented, generated, processed, and/or transmitted. This sound can be provided in real-time to a listener, processed and delayed, or stored in memory. Examples of capturing sound include, but are not limited to, A-B technique or Time Difference Stereo (e.g., using two spaced apart omnidirectional microphones to record audio signals), X-Y technique or Intensity Stereophony (e.g., using two microphones at a same location and pointed at different angles), Mid/Side Stereophony (e.g., using two bidirectional microphones facing different directions), Near-Coincident technique (e.g., combining principles of the A-B technique, the X-Y technique, or other techniques), processing monophonic sound (e.g., processing recorded monophonic sound to create an impression of stereo sound), spaced microphones on a dummy or model human head (e.g., placing microphones in an eardrum or at the ear of an artificial head or a printed 3D head), spaced microphones on a real human head (e.g., placing microphones in eardrum or at the ear of the human head), spaced microphones on a stationary or moving object such as a purse, a human, an electronic device, a motorized vehicle, a bicycle, etc., augmented stereo (e.g., recording stereo sound and processing it to imprint head-related transfer functions (HRTFs) to produce binaural sound), a technique that uses one or more microphones (e.g., spacing microphones to capture sound), or generated sound with a computer.

Block 110 states designate a sound localization point at a location in empty space that is away from and proximate to a location of the listener such that the sound localization point simulates an origin of the sound that the listener hears.

A listener of the detected sound can localize the sound to determine a distance and a direction of the sound. For example, a listener of a detected sound perceives a point or an area (i.e., a sound localization point) from where the sound emanates or originates. For captured sound replayed electronically, this perceived sound localization point is at or near the device emitting the sound, such as an electronic speaker. Example embodiments can modify or move the sound localization point to a location that is apart from and away from the device emitting the sound. A sound localization point can exist in a three-dimensional (3D) position described by an azimuth or horizontal angle, elevation or vertical angle, and distance from the listener for static sounds or velocity with respect to the listener for moving sounds. A sound localization point can also exist in a two-dimensional (2D) position described by an azimuth or horizontal angle and distance from the listener for static sounds or velocity with respect to the listener for moving sounds.

For example, if a position and a shape of the ears of a listener are known or estimated to a suitable degree of accuracy, binaural sound delivered to this listener can be altered in order to create, move, and/or adjust the sound localization point. A location of sound and/or a direction to the sound can be altered or created using one or more head-related transfer functions (HRTFs), accounting for differences in arrival times between the ears (interaural time differences), differences in amplitude or level of the sound between the ears (interaural level differences), asymmetrical spectral reflections from parts of the body (such as torso, shoulders, and pinnae), phase delays, group delays, and a ratio of the direct signal to the reverberated signal.

A computer, electronic device, or a person can designate the sound localization point. For example, a listener may set a sound localization point to follow him as he moves, remaining at a fixed point in his frame of reference, adjacent to or near himself, such as a point three feet to his left at the height of his own head. As another example, a computer program may set a sound localization point at a static geographic location such as a predetermined Global Positioning System (GPS) location or a specific location in a room or building. As another example, a speaking person could set the sound localization of his transmitted voice to a point within the reference frame of the listener, six inches from the face of the listener. As another example, an electronic device such as a tablet may set the default sound localization of music it is playing to a point one foot directly above where it lays flat on a desk.

Block 120 states adjust the sound so the sound originates from the sound localization point at the location in empty space that is away from and proximate to the location of the listener.

Adjustments to the sound are made so the sound emanates or originates from the sound localization point. For example, the sound is processed so sound localization occurs for the listener to emanate from or originate at the sound localization point. For instance, the sound is processed to alter, add, or generate head-related transfer functions (HRTFs), interaural time differences, and/or interaural level differences to correspond to a fixed or variable distance from the listener, a coordinate location or a GPS location of the sound localization point.

Block 130 states provide the sound to the listener such that the listener localizes the origin of the sound at the sound localization point in empty space.

The sound appears to emanate from or originate from the sound localization point that is away from the listener. The origin of this sound can be a location in empty space, such as a place where no physical object exists or a location where a physical object exists. Further yet, an origin of this sound from the point-of-view of the listener can be proximate to the listener (such as in a same room) or far away from the listener (such as several kilometers away).

A sound localization point (SLP) or a virtual microphone point (VMP) can be designated to an empty space, an occupied space, or an available space. For example, an available space is an empty space that is also unoccupied by a SLP, VMP, virtual object, or other manifestation or representation of a remote real or virtual character or object. An individual may also designate in accordance with these embodiments a non-empty or a non-available space as a SLP and/or VMP. For example a listener designates a chair as SLP for a remote speaking person, and the chair is occupied by a doll or pet dog in which case the listener would perceive the voice of the remote speaking person as emanating from the doll or dog. In another example where a listener is conversing with two other people on a conference call, the listener designates the SLP of both voices at the same cigar box laying on the conference table, and the VMP of both voices also at the point of the cigar box. These designations create a perception for the listener that both voices are emanating from the same cigar box, and both are listening from the same cigar box.

In an example embodiment, a distance from the sound localization point to the listener is different than a distance from an origin of the sound to the microphones that captured the sound. Furthermore, a horizontal angle and/or a vertical angle from the sound localization point to the listener are different than a horizontal angle and a vertical angle from the origin of the sound to the microphones. For example in a Cartesian coordinate system, a microphone is located at (0, 0, 0) with an origin of sound located at (5, 9, 15). The sound is adjusted to change one or more of the (X, Y, Z) coordinates. For instance, when a listener is located at (0, 0, 0), an origin of the sound or the sound localization point for the listener appears to originate from (10, 17, 25). As another example, microphones are located in earpieces of a talking person. A listening person wears earpieces with speakers in each ear and hears a voice of the talking person originating from a point that is ten feet to one side of the listening person at a height equal to a height of the listening person.

The coordinates and/or locations of multiple different sounds can simultaneously be changed. For example, microphones capture sound from two different speaking people and from a background noise source. Locations of the speaking people with respect to the microphones are altered, and the background noise is filtered.

Consider an example in which binaural sound of a bird chirping is recorded while microphones are two feet away from and at a same height of the bird. A listener of this recording would localize the bird to be two feet away since the microphones were two feet away from the real bird at the time of the recording. The sound localization point (i.e., two feet away from the listener) is changed to generate a different sound localization point. For example, the binaural sound is processed to change the sound localization point from being two feet away from the listener to being thirty feet away from the listener. In this example, moving the sound localization point includes changing one or more of localization of a vertical elevation of the sound, a horizontal elevation of the sound, and a distance to an origin of the sound.

Consider an example in which a listener sits at his kitchen table and has an electronic telephone call with his mother. Both the listener and the mother wear electronic devices in or near their ears that capture, transmit, and provide sound for the telephone call. These electronic devices record binaural sound of the speaker and provide binaural sound to the listener. The listener designates an empty kitchen chair next to him as a sound localization point for the voice of his mother. During the telephone call, the voice of the mother appears to originate from the empty kitchen chair such that the listener localizes her voice to this location. From the point of view of the listener, the telephone conversation sounds like the mother is sitting in the kitchen chair and talking to the listener.

Figure 2:
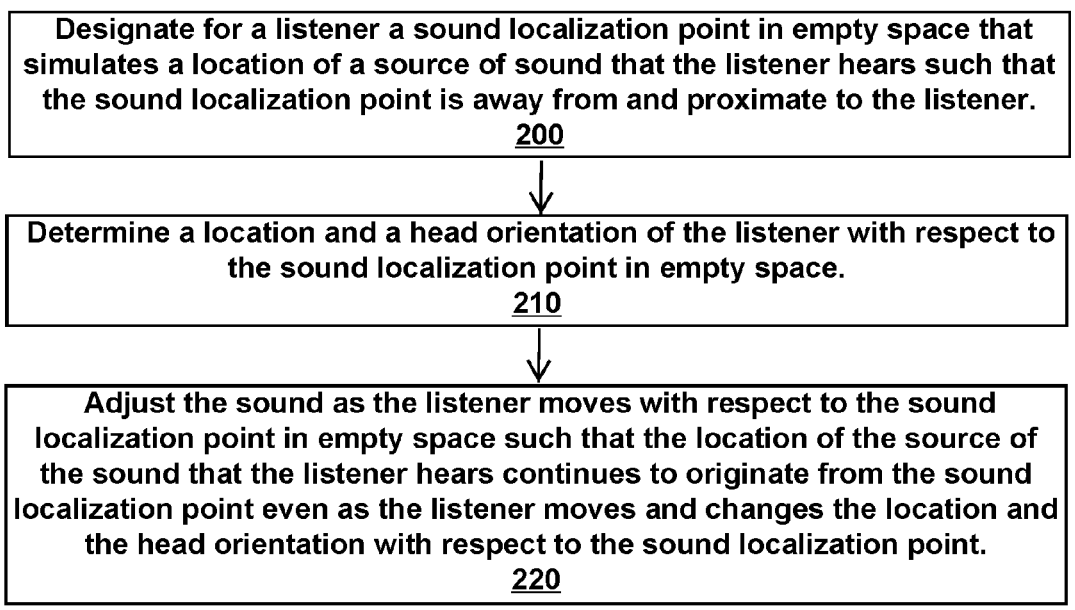
FIG. 2 is a method to adjust sound as a listener moves with respect to a sound localization point in accordance with an example embodiment.

FIG. 2 is a method to adjust sound as a listener moves with respect to a sound localization point.

Block 200 states designate for a listener a sound localization point in empty space that simulates a location of a source of sound that the listener hears such that the sound localization point is away from and proximate to the listener.

A person or an electronic device designates the location of the sound localization point. For example, the listener of the sound, a speaker of the sound, or a computer that transmits, processes, stores, and/or provides the sound designates where an origin of the sound will occur. This location for the origin of the sound can be different from a localization point when the sound was recorded or captured.

Consider an example in which two spaced apart microphones record binaural sound. These microphones are stationary in a room and record the following sounds that occur in the room: footsteps at a first coordinate (a first vertical angle, a first horizontal angle, and a first distance), a voice of a person talking at a second coordinate (a second vertical angle, a second horizontal angle, and a second distance), and a sound of an opening door at a third coordinate (a third vertical angle, a third horizontal angle, and a third distance). The binaural recordings of the three sounds (i.e., footsteps, voice, and opening door) can be stored to preserve their original sound localization points. As such, a listener of the recording would hear the footsteps at the first coordinate, the voice at the second coordinate, and the opening door at the third coordinate. Alternatively, the binaural recordings of these three sounds can be altered to change their respective sound localization points to new or different sound localization points. As such, a listener of the altered recording would hear the footsteps at a fourth coordinate different than the first coordinate, the voice at a fifth coordinate different than the second coordinate, and the opening door at a sixth coordinate different than the third coordinate.

Block 210 states determine a location and a head orientation of the listener with respect to the sound localization point in empty space.

The sound localization point can represent an origin of a sound, such as a voice of a person. The sound appears to emanate from the sound localization point as if the person were located at this point and speaking.

The listener has a head orientation and a location with respect to this sound localization point. For example, a head orientation of the listener could be directed at, toward, or away from the sound localization point. A location of the listener could be at, next to, near, or far from the sound localization point. The location and head orientation can be given as distances and angles, such as being at an X-Y-Z coordinate or being ten degrees (10°) azimuth, twenty-five degrees (25°) elevation, and six (6) feet.

Measurements can be made of the location and the head orientation of the listener with respect to the sound localization point. By way of example, these measurements can be made with one or more electronic devices with facial recognition, a motion capture system, a gaze tracker, a GPS locator, a system tracking angular head velocity and/or acceleration, a camera (including a camera in a computer or an augmented or virtual reality application), a tag (such as a radio, radio frequency identification (RFID), or GPS tag system), binaural headsets or ear pieces (for example sensing interaural level differences and/or interaural time differences), a laser, a sensor (such as a sensor located in a smartphone on which a person speaking), a gyroscope, a magnetometer, and an accelerometer. For instance, a head orientation tracker measures one or more rotational head orientations of yaw (side-to-side or left and right), pitch (up and down), and roll (tilting) of the head.

Block 220 states adjust the sound as the listener moves with respect to the sound localization point in empty space such that the location of the source of the sound that the listener hears continues to emanate from or originate from the sound localization point even as the listener moves and changes the location and the head orientation with respect to the sound localization point.

Measurements for the head orientation and location of the listener can occur in real-time, such as being measured continuously, continually, periodically, in response to motion, or in response to an action or event. As the listener moves a head orientation and/or a location with respect to the sound localization point, the sound continues to appear to emanate or originate from the sound localization point. For example, adjustments are made to amplitude of the sound, interaural time differences, interaural level differences, and head-related transfer functions (HRTFs). These adjustments are made in real-time as the listener moves.

Consider an example in which sound of an artificial or imaginary bird singing is localized to a real tree in a park. A listener wears an earpiece that communicates with an electronic system that provides binaural sound recordings of the bird to the listener. The electronic system tracks a location and a head orientation of the listener with respect to the tree. Assume the listener is standing in the park such that the listener hears the sound of the bird singing up in the tree that is located behind the listener. The singing of the bird thus appears to emanate from the tree that is behind the listener. As the listener turns around to face the tree, adjustments are made to the binaural sound such that the singing appears to emanate in the tree and in front of the listener. As the listener walks toward the tree, amplitude of the singing increases (i.e., the sound gets louder) since the listener is moving closer to the sound localization point of the bird singing in the tree. If the listener walked to a location under the tree, then the singing of the bird would appear to be directly above the listener.

Consider an example in which a listener has a video call with a friend on a notebook computer. An image or video of the friend appears on a display of the notebook computer, and the listener wears earphones that provide binaural sound to the listener. The notebook computer tracks a position of the listener as he moves with respect to the notebook computer. Variations in the binaural sound emulate variations as if the notebook computer were the head of the friend such that the listener localizes sound to the notebook computer that is a sound localization point. In other words, from a pure audial point-of-view, the listener hears his friend as if his friend were situated at the location of the notebook computer. Adjustments are made to the interaural time differences, interaural level differences, and HRTFs as the listener moves his body and head with respect to the location of the notebook computer.

Consider an example in which voices of participants in an electronic conference call are localized to specific points or areas in space around one or more participants. Sound is then adjusted based on head orientation and/or location of the participants. Talking with a person over an electronic device more closely emulates talking with the person as if both parties were talking directly to each other.

During a communication between two or more participants, binaural sound is adjusted in real time in response to movements of the participants in order to emulate the experience of talking face-to-face directly with a human. The sound that a listener hears also changes as the listener changes a distance to the sound localization point. For example, sound intensity decreases inversely proportional to a square of the distance from a measuring point (e.g., an ear of a listener) to an origin of the sound. Sound that a listener hears also changes as the head orientation of the listener changes with respect to the origin of the sound, such as moving the head left-right, up-down, or in a tilting motion. For example, the interaural time difference changes as the listener moves his head and changes an angle with respect to the sound source, such as changing from a 0 degree azimuth to a 180 degree azimuth.

Consider a first scenario in which John and Paul are talking as they sit twelve feet apart in an apartment room. During the conversation, John stands from his chair, walks to the refrigerator, opens a can of soda, and returns to his chair. Paul remains in his chair as John walks to the refrigerator. Paul hears John since both individuals are located in the room together.

Consider a second scenario in which Paul travels to another country, and John initiates a video call with Paul. John sits in his chair and his notebook computer rests in Paul's chair that is twelve feet away (i.e., the same chair where Paul sat in the first scenario). John and Paul have the same conversation as in the first scenario, and John performs the same actions (i.e., during the conversation, John stands from his chair, walks to the refrigerator, opens a can of soda, and returns to his chair). In this second scenario, the notebook computer provides Paul's voice in stereo sound. John does not hear or perceive Paul's voice in the same manner as the first scenario since the notebook computer provides Paul's voice in stereo sound.

Consider a third scenario in which Paul travels to another country and initiates a call with John. John and Paul both wear electronic earpieces that record and provide binaural sound. When the call initiates, the voice of Paul is localized to his empty chair in John's apartment while John sits in his chair. John and Paul have the same conversation as in the first scenario, and John performs the same actions (i.e., during the conversation, John stands from his chair, walks to the refrigerator, opens a can of soda, and returns to his chair). In this third scenario, John hears and perceives Paul's voice in a same manner as in the first scenario. In the first and third scenarios, Paul's voice had a same sound localization point for John even as John moved around the room. In the first and third scenarios, the sound intensity, the interaural time differences, the interaural level differences, and output from the HRTFs changed in real time as John stood from his chair, walked to the refrigerator, opened the can of soda, and returned to his chair. From John's point-of-view, the first and third scenarios were audibly the same since the sound that John heard in the third scenario copied or emulated the sound that John heard in the first scenario.

Consider a fourth scenario in which John specifies a sound localization point in the apartment for Paul's voice on the occasion of each call, such as specifying a location on a couch or standing in a doorway. Alternatively, Paul's voice originates from a starting default sound localization point on the occasion of each call. For example, this default sound localization point is three feet from John at a vertical height equivalent to the vertical height of John's head.

Consider a fifth scenario that is similar to the third scenario. In the fifth scenario, however, the sound localization point of Paul changes or moves during the conversation. Initially, Paul's voice is localized to his chair. When John stands up and begins to walk toward the refrigerator, the sound localization point of Paul moves and follows John as if Paul were present in the apartment and moving with the sound localization point.

Consider an example in which a listener is located in a room with speakers, and the listener does not wear headphones or an electronic device providing sound to the ears. The speakers provide binaural sound to the listener, and a crosstalk cancellation (CTC) system adjusts, removes, filters, or moves a crosstalk location in real-time as the listener moves around the room. Multiple sound localization points exist in the room, and binaural synthesis of sound dynamically occurs in real-time as the listener moves his head and/or body. As the listener walks around the room, the sound localization points remain fixed or unmoved to provide virtual sound sources located in the room. If the virtual sound source represents a fixed object, then the virtual sound source remains fixed in the room. For instance, sound that emanates from a virtual water fountain is a fixed sound source since the virtual water fountain does not move. If the virtual sound represents a moving object, then the virtual sound source moves in the room. For instance, sound that emanates from a virtual bird can move since the bird can fly from one location in the room to another location in the room and thus change its sound localization point.

Figure 3:
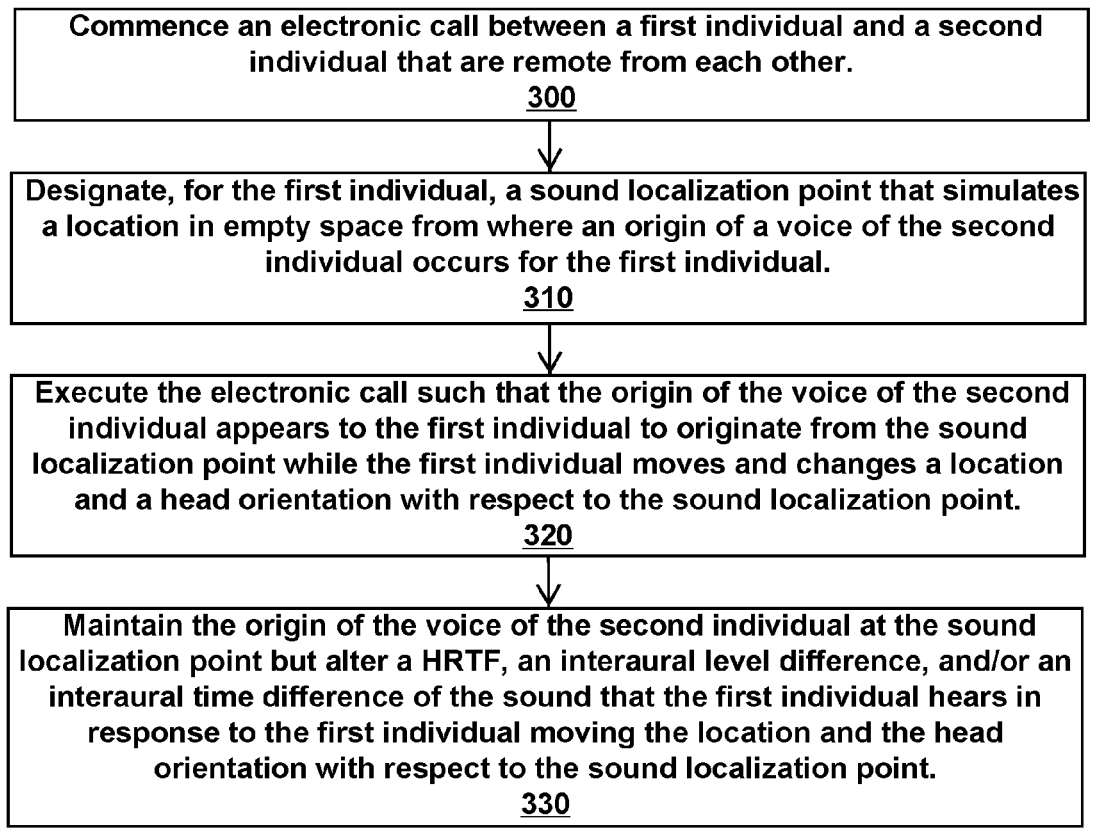
FIG. 3 is a method to adjust sound in an electronic call in response to a listener moving a location and a head orientation with respect to a sound localization point in accordance with an example embodiment.

FIG. 3 is a method to adjust sound in an electronic call in response to a listener moving a location and a head orientation with respect to a sound localization point.

Block 300 states commence an electronic call between a first individual and a second individual that are remote from each other.

The electronic call can be commenced with an electronic device that includes, but is not limited to, a smartphone, a computer (such as a tablet computer, a notebook computer, a desktop computer, etc.), a handheld portable electronic device (HPED), a wearable electronic device (such as electronic glasses, an electronic watch, an electronic earpiece, headphones, etc.), a telephone, a computer system, and an electronic system.

The first and second individuals are acoustically remote from each other, such as being in separate physical or computer-generated rooms, separate physical or virtual buildings, separate virtual realities or online games or computer rendered chat or play spaces, different cities, different states, different countries, etc.

Block 310 states designate, for the first individual, a sound localization point that simulates a location in empty space from where an origin of a voice of the second individual occurs for the first individual.

The sound localization point represents a location where the first individual localizes the voice of the second individual during the electronic call. Even though the second individual is physically or virtually remote from the first individual, the first individual can localize the voice of the second individual in a similar manner as if the second individual were proximate to and talking with the first individual (such as both individuals being in a same room together).

Block 320 states execute the electronic call such that the origin of the voice of the second individual appears to the first individual to originate from the sound localization point while the first individual moves and changes a location and a head orientation with respect to the sound localization point.

As the first individual moves with respect to the sound localization point, the voice of the second individual continues to emanate from or originate from a fixed or stationary location at the sound localization point in the environment of the first individual. These movements include the first individual changing his distance to the sound localization point and moving or rotating his head with respect to the sound localization point.

A sound localization point can exist as a single point in space (such as emulating a point source of sound from a person speaking) or as an area in space (such as a two dimensional (2D) area, a plane, or a three dimensional (3D) volume in space).

Block 330 states maintain the origin of the voice of the second individual at the sound localization point but alter a HRTF, an interaural level difference, and/or an interaural time difference of the sound that the first individual hears in response to the first individual moving the location and the head orientation with respect to the sound localization point.

As the first individual moves with respect to the sound localization point, one or more aspects of the sound are altered to compensate for the movements such that the sound the first individual hears continues to be localized at the sound localization point. For example, one or more of a HRTF, an interaural level difference, and/or an interaural time difference are altered.

Consider an example in which a first and a second individual that are remote from each other engage in an electronic call. A voice of the second individual localizes to the first individual on a chair that is six feet directly in front of the first individual. During the electronic call, the first individual moves closer to the chair while the voice of the second individual remains unmoved on the chair. In response to this movement of the first individual, a sound intensity of the voice of the second individual increases inversely proportional to a square of the distance from the ears of the first individual to the sound localization point at the chair. This change in sound intensity occurs in real time as the first individual moves closer to the chair.

Continuing with this example of an electronic call, the first individual rotates his head to his right while listening to the second individual. When the first individual was directly in front of the sound localization point, the voice of the second individual reached both ears of the first individual at the same time. When the first individual rotates his head to the right, however, the voice of the second individual would first reach the left ear and then reach the right ear of the first individual. The voice of the second individual is adjusted to provide an interaural time difference and a shadowing effect that compensates for the degree of rotation of the head of the first individual.

Figure 4:
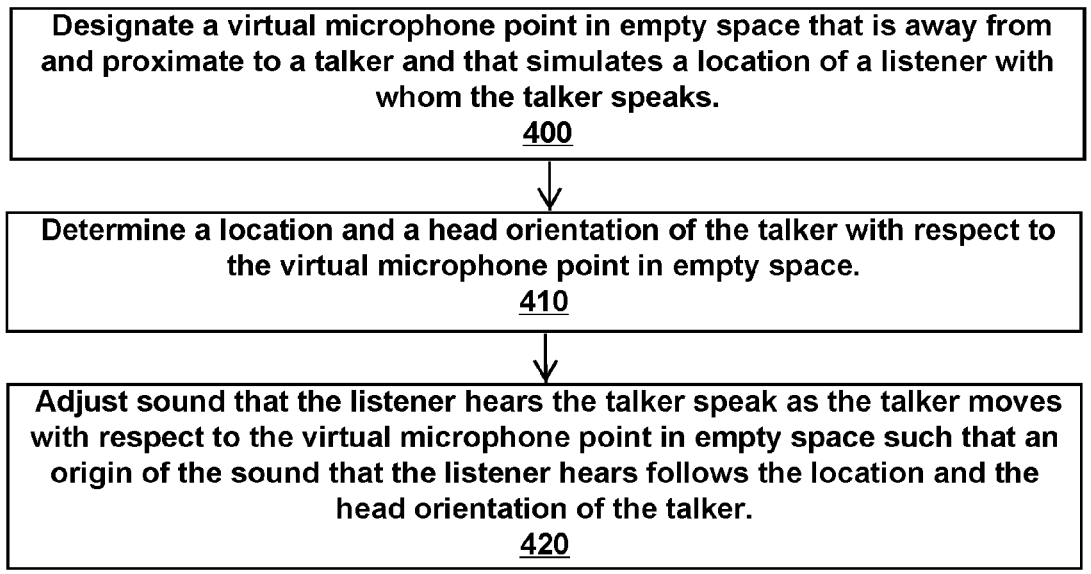
FIG. 4 is a method to adjust sound that a listener hears as a talker moves with respect to a virtual microphone point in accordance with an example embodiment.

FIG. 4 is a method to adjust sound that a listener hears as a talker moves with respect to a virtual microphone point (VMP).

Block 400 states designate a virtual microphone point in empty space that is away from and proximate to a talker and that simulates a location of a listener with whom the talker speaks.

By way of example, the virtual microphone point can be several inches to several feet or farther from the talker. A person or an electronic device can establish the virtual microphone point, such as designating a distance from the talker to the virtual microphone point and a horizontal angle and a vertical angle from a head of the talker to the virtual microphone point.

Block 410 states determine a location and a head orientation of the talker with respect to the virtual microphone point in empty space.

By way of example, the virtual microphone point represents a mouth and head of the listener. A determination is made of the distance from the ear or ears of the talker to this point and a head orientation of the talker with respect to this point.

Block 420 states adjust sound that the listener hears the talker speak as the talker moves with respect to the virtual microphone point in empty space such that an origin of the sound that the listener hears follows the location and the head orientation of the talker.

By way of example, one or more adjustments are made to a HRTF, an interaural time difference, and an interaural level difference of the sound provided to the listener. Sound can also be adjusted based on calculations made for sound attenuation and sound reverberation.

Consider an example in which a talker is in an empty room and wears headphones or earpieces with microphones that record binaural sound. A virtual microphone point is twenty feet away from the talker and represents a location of a listener or a recording location. This virtual microphone point is actually empty space since the room is empty except for the presence of the talker. The microphones record binaural sound as the talker walks around the room, speaks, and makes sounds (such as footstep sounds). An electronic device tracks a location and a head orientation of the talker as the talker walks around the room. These locations and head orientations are stored and correlated with the sound being recorded. Adjustments to the sound are made as the talker moves and changes location and head orientation. For example, sound intensity is adjusted as the talker moves closer to and farther away from the virtual microphone point that was designated as an imaginary, empty point in space. As another example, interaural time differences change as the talker moves his head and/or walks around the virtual microphone point (i.e., as the talker changes a horizontal and/or vertical angle with respect to the virtual microphone point). The recorded sound is then provided to a listener that is remote from the talker. The listener hears the recorded sound as if the listener were present in the room with the talker and situated at the virtual microphone point.

Figure 5:
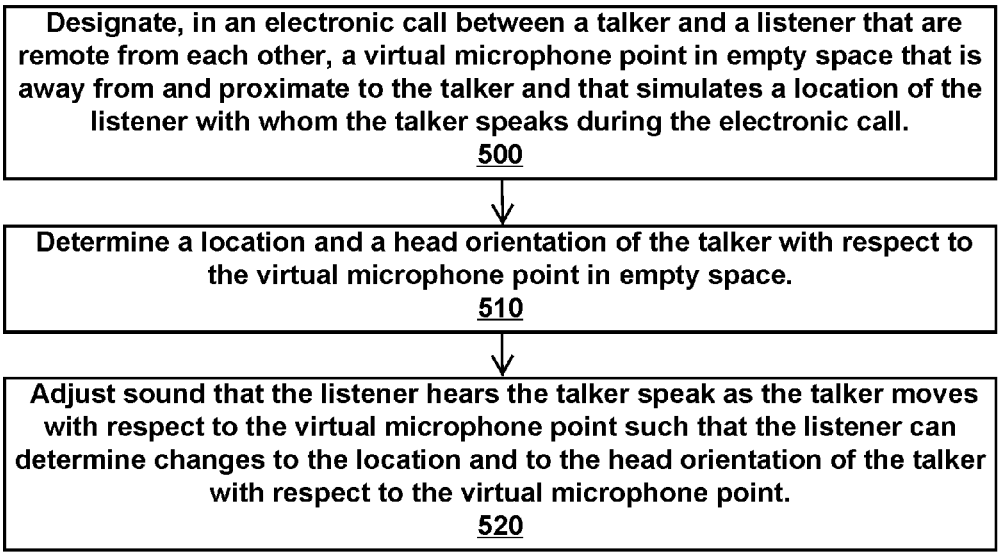
FIG. 5 is a method to adjust sound that a listener hears as a talker moves with respect to a virtual microphone point during an electronic call between the talker and the listener in accordance with an example embodiment.

FIG. 5 is a method to adjust sound that a listener hears as a talker moves with respect to a virtual microphone point during an electronic call between the talker and the listener.

Block 500 states designate, in an electronic call between a talker and a listener that are remote from each other, a virtual microphone point in empty space that is away from and proximate to the talker and that simulates a location of the listener with whom the talker speaks during the electronic call.

For example, the talker designates the virtual microphone point as a location next to the talker, and this location represents a location of where the listener would be located if the listener were physically present with the talker. This location is located where the listener would be standing, sitting, or otherwise located if the two people were talking to each other in person.

Block 510 states determine a location and a head orientation of the talker with respect to the virtual microphone point in empty space.

The virtual microphone point can include a simulated listener with a simulated body that includes a head. This simulated head can have attributes such as a face, ears, mouth, head orientation, etc. The location and the head orientation of the actual listener can be determined with respect to these attributes of the simulated listener. For example, a determination is made as to the head orientation of the talker with respect to the head orientation of the simulated listener. For instance, the talker is looking toward, facing, and speaking directly at the simulated listener (e.g., as if the listener and the talker were standing, facing each other, and talking).

Block 520 states adjust sound that the listener hears the talker speak as the talker moves with respect to the virtual microphone point such that the listener can determine changes to the location and to the head orientation of the talker with respect to the virtual microphone point.

Sound adjustments are made to emulate a sound that the listener would hear if the listener and the talker were talking to each other in person with the listener being located and orientated at the location of the virtual microphone point. In other words, a determination is made as to what sound the listener would hear if the listener were standing or sitting next to the talker or otherwise physically located at or proximate to the virtual microphone point.

Consider an example in which a first person and a second person engage in an electronic telephone call in which both people wear headphones with speakers and microphones to capture and transmit binaural sound. The first person physically sits in a chair that faces an empty second chair that has a sound localization point and a virtual microphone point of a simulated or virtual second person. This simulated or virtual second person sits in the chair with a head being located four feet from the ground and being orientated to face the first person. The second person is physically remote from the first person and the virtual microphone point. Sound that the second person hears during the telephone call copies or emulates the sound that the second person would hear if the second person were sitting in the chair, facing the first person, and having a head located four feet from the ground (i.e., orientated in the chair as the simulated second person). When the first person moves his head orientation with respect to the chair, then adjustments to the sound that the second person hears are made to compensate for these changes in head orientation. Likewise, when the first person moves a location with respect to the chair (e.g., moves toward or away from the second chair), then adjustments to the sound that the second person hears are made to compensate for these changes in location.

Consider an example in which two people (a first individual and a second individual) are communicating with each over an electronic telephone call. The first individual localizes a voice of the second individual at a first sound localization point and a first virtual microphone point that are next to the first individual, and the second individual localizes a voice of the first individual at a second sound localization point and second virtual microphone point that are next to the second individual. During the conversation and while the second individual is talking to the first individual, the second individual walks toward the second sound localization point and the second virtual microphone point (i.e., the point that represents a speaking and/or listening location for the first individual). This action causes the intensity of sound that the first individual hears to increase since the second person walks closer to the virtual microphone point. As the second individual walks toward the second virtual microphone point, the voice of the second individual becomes louder for the first individual. Increasing the volume of the sound in this manner simulates or emulates a scenario in which the first and second individuals were physically together and talking with the second individual walking towards the first individual.

The sound localization point and/or virtual microphone point can be a single location or multiple different locations, such as one or more points or areas that represent a source or origin of the sound or source for recording or capturing sound. For example, a point in space represents a location of an ear of a person or a mouth of a person even though these points are actually empty (i.e., the person or another object is not located at this point). As another example, the sound localization point and/or virtual microphone point have a shape and size that represent and copy a shape and a size of the origin of the sound. For instance, if the origin of the sound is a bluejay bird, then the sound localization point has a size and shape of a real bluejay bird.

The sound localization point and virtual microphone points can emulate actions of the object that the sound localization point and virtual microphone point represent. Consider an example in which the sound localization point represents a chirping bluejay bird. Movements and habits of a real bluejay bird are incorporated into the sound localization point that emulates the bluejay bird. For instance, the sound localization point moves to emulate a live, moving bluejay bird that is chirping in a tree. These movements and actions can represent the real bluejay bird from whom the sound was captured, or the movements and actions can represent characteristics of the species. Consider an example in which the virtual microphone point represents a head and body of a listener, and this point moves to emulate customary, habitual, previous, projected, or real-time movements of the listener.

The sound localization point and virtual microphone point can also exist at a location that is occupied by an inanimate object (i.e., an object not endowed with life). This inanimate object can copy the real object that provides or hears the sound. For example, sound from a real bluejay bird emanates from a sound localization point of a plastic, artificial bluejay bird. This artificial bluejay does not actually emit sound. Instead, binaural sound that a listener hears appears to originate from a location in space that occurs at the artificial bluejay bird. As another example, a manikin represents a virtual microphone point for a remote listener while a talker talks to the manikin.

The inanimate object can be unrelated to the real object that provides the sound. For example, sound from a real person emanates from a sound localization point of a wooden chair. No sound originates from the chair or even near the wooden chair. Instead, the sound is localized to the listener to appear to emanate from or originate from the wooden chair. As another example, a talker designates a virtual microphone point as an empty chair. This chair does not actually include microphones since the actual or physical microphones are located elsewhere, such as being located on, with, or near the talker.

Figure 6:
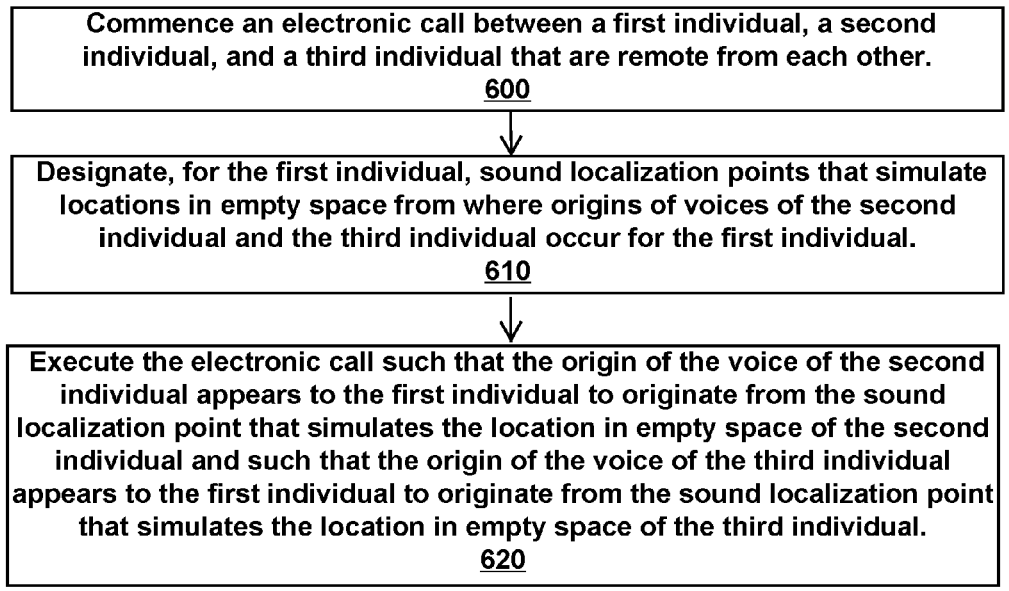
FIG. 6 is a method to designate sound localization points for individuals during an electronic call in accordance with an example embodiment.

FIG. 6 is a method to designate sound localization points for individuals during an electronic call.

Block 600 states commence an electronic call between a first individual, a second individual, and a third individual that are remote from each other.

Each individual exists at a different geographical location, such as being in different rooms, buildings, cities, states, countries, computer generated virtual spaces, etc. Further, each individual has an electronic device that assists in executing the electronic call.

Block 610 states designate, for the first individual, sound localization points that simulate locations in empty space from where origins of voices of the second individual and the third individual occur for the first individual.

A different sound localization point is designated for the second individual and for the third individual. For example, these sound localization points represent a location of the physical bodies of the second individual and the third individual, such as being at locations where these individuals would be if they were present with the first individual.

Block 620 states execute the electronic call such that the origin of the voice of the second individual appears to the first individual to originate from the sound localization point that simulates the location in empty space of the second individual and such that the origin of the voice of the third individual appears to the first individual to originate from the sound localization point that simulates the location in empty space of the third individual.

Consider an example in which a first person desires to have a conference call with a second individual and a third individual. The first person sits at a large wooden table that is located in an office conference room. A sound localization point for the second individual is designated at a first empty chair at the table, and a sound localization point for the third individual is designated at a second empty chair at the table. During the conference call, a voice of the second individual that the first individual hears appears to originate from the first empty chair, and a voice of the third individual that the first individual hears appears to originate from the second empty chair.

Consider an example in which a first person engages in an electronic call with a second person and a third person that are remote from the first person. From a point-of-view of the first person, a voice of the second person localizes on a couch in a family room, and a voice of the third person localizes in a doorway that is fifteen (15) feet away from the couch. The first person wears electronic glasses that include microphones that capture sound and transmit the sound to the second and third persons. When the first person talks in the family room, sound transmits to the second and third persons based on a head orientation of the first person and a distance between the localization points and the first person. During the call, the first person walks to the couch, turns his head away from the doorway, and speaks in a low voice to the sound localization point of the second person on the couch. The second person hears this voice, but the third person is not able to hear the voice since the sound provided to the third person is adjusted based on a distance to the third person's localization point at the doorway and a head orientation of the first person away from the third person's localization point. Sound transmits to the second and third persons as if they were present in the family room at their respective localization points.

An electronic device can intelligently assign locations for one or more sound localization points or virtual microphone points. Selection of the location can be based on, for example, available space near the listener, location of another person, previous assignments of sound localization or virtual microphone points, type or origin of the sound, environment in which the listener is located, objects near the person, a social status or personal characteristics of a person, a person with whom the listener is communicating, time of arrival or reservation or other time-related property, etc.

Consider an example in which a first individual engages in a conference call with a second individual and a third individual who are localized at chairs around a conference table. A fourth individual decides to join this conference call, and a sound localization point for this fourth individual is automatically located in an empty chair at the conference table such that the sound localization points for the second, third, and fourth individuals are equally spaced around the conference table.

A designation of a sound localization point can be based on tracking and location information of a person. Consider an example in which a boss walks into an office of his employee and habitually stands at or near a doorway while talking to the employee in the office. This location of the doorway where the boss stands in the office is a preferable, habitual, or favorite location since the boss repeatedly stood there on numerous previous occasions. Subsequently, the boss telephones the employee while the employee is located in the office. A voice of the boss automatically localizes to the location in the doorway.

Consider an example in which an individual sits on a park bench next to a playground that is void of other people. The individual listens to sounds of singing birds that are localized to a tree next to the park bench. The individual interacts with his smartphone and selects the addition of children to his audial proximity. A software program determines a GPS location of the individual and determines an existence of a playground nearby. The software program intelligently localizes sounds of children to exist at the playground. The individual sits at the park bench and listens to birds singing in the tree and children playing on the playground even though the tree is void of any birds and the playground is void of any children.

Intelligent localization of an origin of sound can also occur based on a location and/or orientation of the listener. For example, an individual designates telephone calls to have sound localization points four feet from his face. When an incoming call occurs, a location and orientation of the face of the individual are determined in order to place the sound localization point of the caller at the designated location.

Intelligent localization of an origin of sound can also occur based on participants in a call. Different individuals are assigned to different sound localization points. For example, while a man is in his bed, his wife calls. Her voice is localized to a location adjacent the man on the bed. After the call is finished, the man receives another call from his brother. The voice of the brother localizes to a doorway in the bedroom while the man is in his bed.

Intelligent localization of an origin of sound can also occur based on other events, such as time of day. Sounds are localized to different locations depending on what time of day the call occurs. For example, calls with an individual that occur in the morning are localized five feet from the individual, and calls that occur in the afternoon or evening are localized eight feet from the individual.

Consider an example in which a person carries as HPED that communicates with earpieces that have speakers. The HPED determines a Global Positioning System (GPS) location of the person and determines that the person is located in a public coffee shop. The HPED receives a telephone call and positions, based on the GPS information, a sound localization point (SLP) and virtual microphone point (VMP) of the caller are placed proximate to a head of the person (e.g., between one and three feet from a face and/or mouth of the person). The person is in a public place and prefers not to speak loudly during the telephone call so the SLP and VMP are close to the face and mouth of the person. Later, the person goes home to his apartment and receives a telephone call. The HPED determines a GPS location of the person being home and positions, based on the GPS information, a SLP and a VMP of the caller in front of the person (e.g., between three and ten feet from a face and/or mouth of the person). The person is in a private place (i.e., his home) and is comfortably speaking more loudly than while in the public place during the telephone call so the SLP and VMP are farther away from the face and mouth of the person. As such, a location of the SLP and VMP are based on an electronic device determining a location of the person (such as being in a public or private location, being proximate to other persons, being proximate to strangers versus friends, etc.). For instance, a public place is a location that is open to the public (e.g., a place with a right of common passage), and private place is a location that is not open to the public (e.g., a house, an apartment, or an office room).

The sound localization point or virtual microphone point can also be changed so as not to conflict with an object, a location, another SLP, another VMP, a person, or an event. For example, a SLP defaults to a point in space that is five feet from a listener in a certain direction, but a wall in a room is located four feet from the listener in this direction. In this example, the SLP changes to be three feet from the listener since this location is not beyond the wall. For example, while a person drives a car, a SLP of a participant during a telephone call occurs in an empty passenger seat next to the driver. Another participant calls the driver during the telephone call, and a second SLP is added to an empty back seat in the car since the front passenger seat is already occupied with a SLP.

A default SLP or VMP can also be changed when such a point is not practical or convenient. For example, a person designates a SLP for telephone calls to be five feet in front of his face. The person receives a phone call while driving a vehicle, but the SLP would be outside of the vehicle in front of the windshield and hence not in a practical or convenient location. The SLP is automatically changed to be two feet to one side of the person and hence in the vehicle.

Figure 7:
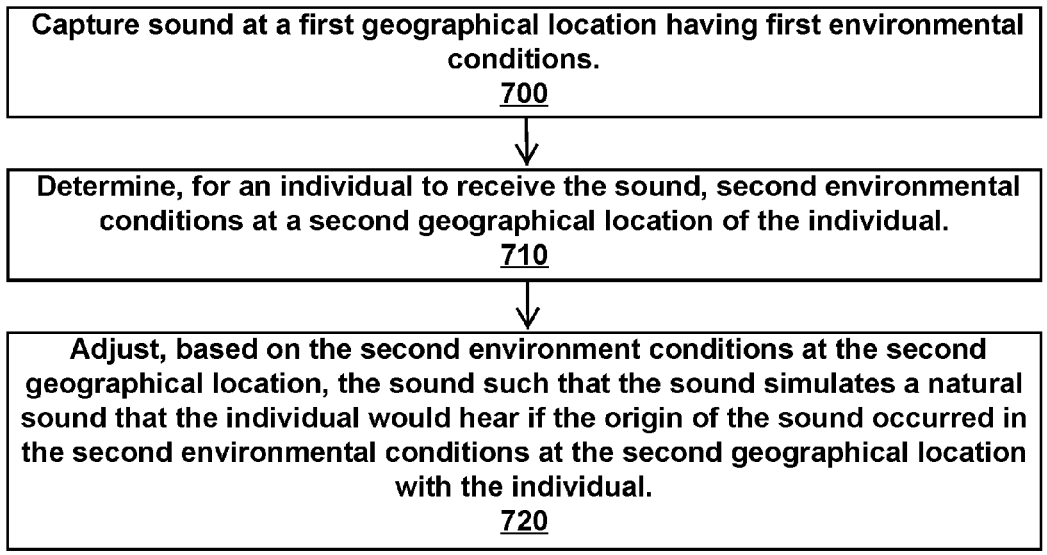
FIG. 7 is a method to adjust sound based on a physical environment of an individual in accordance with an example embodiment.

FIG. 7 is a method to adjust sound based on a physical environment of an individual.

Block 700 states capture sound at a first geographical location having first environmental conditions.

This sound is captured at a first geographical location, such as in a room, in a building, outdoors, etc. The first geographical location has a first set of physical, environmental, or ambient conditions, such as temperature, humidity, wind, terrain, elevation, objects (manmade or natural) at the location, size and/or shape of structure in which the sound is captured (e.g., if sound captured indoors as opposed to captured outdoors), etc.

Block 710 states determine, for an individual to receive the sound, second environmental conditions at a second geographical location of the individual.

The origin of the sound is captured at a first geographical location with first environmental conditions. The individual to receive the sound exists at a second geographical location with second environmental conditions that are different than the first environmental conditions.

The conditions, objects, and circumstances that surround an individual or a thing creates an environment that has an impact on how sound transmits and how this sound is heard. The environmental conditions or physical environment include, but are not limited to, movable objects (such as furniture, electronic and non-electronic devices, people, things, etc.), immovable objects (such as walls, doorways, ceilings, rooms, floors, structures, etc.), size and shape of a room or a location in which sound propagates, natural objects (such as trees, grass, plants, etc.), manmade objects, weather or ambient environmental conditions (such as temperature, humidity, wind, precipitation, etc.), background or ambient noise at the environment, electromagnetic interference, data bandwidth or data latency limitations or fluctuations within a network of the environment or adjacent networks, and limitations and fluctuations in rendering speed, resolution, and accuracy of computer generated virtual locations.

Consider an example in which the sound is captured from a first individual located in one city and state while the first individual is located in a recording studio sound room. The sound is then provided to a second individual located in another city and state while the second individual is standing outdoors in a snow covered field.

Block 720 states adjust, based on the second environmental conditions at the second geographical location, the sound such that the sound simulates a natural sound that the individual would hear if the origin of the sound occurred in the second environmental conditions at the second geographical location with the individual.

Sound is adjusted to compensate for a physical environment in which a listener hears the sound so the sound appears to the listener to have emanated from or originated in this physical environment even though the sound actually originated from a different physical environment. Sound that the listener hears more closely emulates sound that the listener would hear if the sound actually originated from the sound localization point in the physical environment of the listener.

In the physical environment, various factors can affect how sound reverberates, reflects, refracts, and attenuates. These factors include, but are not limited to, geometric spreading, atmospheric effects, and surface effects. The effects on sound from these factors can be measured, estimated, stored, retrieved, and applied as one or more adjustments to the sound.

Geometric spreading includes spherical and cylindrical spreading of sound. For example, in spherical spreading from a point source, the sound level generally reduces according to the inverse square law (e.g., sound reduces by a known or given amount for each doubling of the distance from the source of the sound).

Atmospheric effects include molecular relaxation and viscosity effects. Temperature and humidity of the atmosphere of the propagating sound determine an amount of absorption. Absorptions for different frequencies at given temperatures and humidity can be stored and obtained from tables and/or graphs. For example, sound at a frequency of 2 kHz has an absorption rate of about 0.25 dB/100 meters for 30% relative humidity at 68 degree Fahrenheit.

Surface effects include ground absorption and attenuation due to barriers. For example, attenuation results from acoustic energy losses on reflection when the sound propagates over ground. Smooth and hard surfaces (such as tile and wood) produce little absorption, whereas softer surfaces (such as carpet and grass) result in greater absorption. Reflection along the surface can also reduce the sound level. For instance, a ground effect occurs when sound reflected from the ground destructively interferes with the direct wave when the direct wave travels near the ground.

Sound reverberation provides a listener with clues with regard to a spatial context of the sound, such as giving the listener information about a size, shape, and content of a room. A geometric model of an area can be used to provide a reverberation modeling system. For example, a direction and time of sound impulse reflections are calculated with ray tracing, and these reflections are rendered per a delay time and an attenuation filter for transmission and reflection losses. Recursive or loop filters can be used to emulate reverberations that occur later in time.

Objects near the listener can be simulated with diffraction modeling. When a sound impulse strikes an object, a path of this sound diffracts around the object. Sound with a high frequency (e.g., a wavelength smaller than the object) will shadow and attenuate. One or more low-pass filters can be used for various cutoff frequencies to simulate a size of occluding objects.

Consider an example in which reverberation for an actual room or a virtual room is calculated per the following equation (Sabine's equation):

$$RT=0.16(V/SA),$$

where RT is the reverberation time, V is the volume of the room, S is the total surface area, and A is the average absorption coefficient of room surfaces. Sound absorption coefficients can be obtained from memory, such as sound absorption coefficient tables. As an example, a digital reverberation algorithm simulates time domain and frequency domain responses of the room in order to generate a reverberation effect. As another example, one or more feedback delay circuits create a delaying or echoing effect on the sound.

Consider an example in which binaural sound is captured at microphones located on an electronic device with little or no discernible effects from sound reflection, refraction, and attenuation. This sound is transmitted and played to a listener who wears headphones and who stands outside with a sound localization point that is twenty (20) feet away from the listener. The sound is adjusted to account for the outdoor physical environment of the listener so the sound that the listener hears through the headphones emulates the sound that the listener would hear if the speaker were standing at the sound localization point twenty feet from the listener. The sound adjustments can be calculated from one or more of equations and information relating to spreading, absorption, ground configuration, obstacles, pressure, wind, temperature, and humidity.

By way of example, the speed of sound, C, is given by the following equation:

$$C^2=(\partial p/\partial \rho)_s,$$

where p is the pressure, $\rho$ is the density, and the derivative is taken adiabatically (i.e., at constant entropy per particle, s). For example, the speed of sound at twenty degrees Celsius (20° C.) and 1 atmosphere is 331.5 meters/second.

The decibel (dB) or sound pressure level (SPL) provides a quantification for sound pressure levels relative to a logarithmic scale. The intensity level (IL) of sound intensity (I) is given by the following equation:

$$IL=10 \log_{10}(I/I_{ref}) \text{ dB},$$

where $I_{ref}$ is a reference intensity.

The sound pressure level (SPL) is given by the following equation:

$$SPL=20 \log_{10}(P_e/P_{ref}) \text{ dB},$$

where $P_e$ is a measured effective pressure amplitude of the sound wave and $P_{ref}$ is the reference effective pressure amplitude.

Sound attenuation through the outdoor air ($A_T$) is given by the following equation:

$$A_T=10 \log_{10}(L_{ps}/L_{pr})=20 \log_{10}(P_s/P_r) \text{ dB},$$

where $L_{ps}$ is the sound pressure level of the root mean square sound pressure $P_s$ at a distance s from the source, and $L_{pr}$ is the sound pressure level with a root mean square sound pressure $P_r$ measured at a distances r from the source. The total attenuation ($A_T$) is the sum of the attenuation due to geometric spreading ($A_s$) plus atmospheric absorption ($A_a$) plus other effects ($A_e$, such as attenuation from the ground, refraction, scattering, etc.).

Here, attenuation due to geometric spreading ($A_s$) is given by the following equation for a spherical wave:

$$A_s=20 \log_{10}(r_2/r_1) \text{ dB},$$

where $A_s$ is given as the distance between two points $r_1$ and $r_2$ from a source.

Here, attenuation due to atmospheric absorption ($A_a$) is given by the following equation for a spherical wave:

$$A_a=-20 \log_{10}(\exp(-\alpha r)) \text{ dB},$$

where r is the path length of the wave, and $\alpha$ is the attenuation coefficient.

Further, sound is reflected from a surface in which the angle of reflection of the sound wave is equal to the angle of incidence of the wave such that reflective waves can cause constructive and destructive interference.

Further yet, depending on the geometric configuration of nearby objects, sound can diffract and spread out beyond an opening or around obstacles. Diffraction relates to the wavelength of the sound with high frequencies tending to propagate more directly and low frequencies tending to pass from behind objects.

Consider an example in which a first individual communicates via an electronic phone call with a remotely located second individual. The first individual wears headphones or an earpiece that provides binaural sound. A voice of the second individual is localized to a point that is ten feet away from the first individual while the first individual sits in his office. The voice of the second individual appears to originate in a point in space in the office, and this point in space is the sound localization point of the second individual. So, from the point-of-view of the first individual, the voice of the second individual originates in the office as if the second individual were present in the office and talking to the first individual.

In this example, the sound that the first individual hears is captured at the location of the second individual. For example, as the second individual speaks at the remote location, the sound is processed into binaural sound or processed as captured binaural sound, transmitted, and presented to the first individual so that the first individual localizes the sound at the sound localization point in the office. The physical environment in which the first individual is located, however, does not affect the sound since the sound is captured at the location of the second individual and then provided to the first individual through headphones or earpieces.

The sound that this first individual hears can be adjusted to more closely emulate the natural sound that the first individual would hear if the second individual were physically standing or sitting at the sound localization point in the office. These adjustments include modifying the sound to compensate for the physical environment of the first individual. These modifications include adjusting the sound for objects located in the office, a shape of the office, a size of the office, material from which the office is made or composed (e.g., glass windows, concrete floors, wooden walls, a plaster ceiling, etc.). In other words, determine how the sound would propagate from the sound localization point to the first individual that sits in the office. For example, objects between the sound localization point (such as a chair, a table, carpeted floor, plants, etc.) and the first individual would affect how the sound propagates to the first individual. As another example, a shape and size of the office will determine what reverberations would occur if the second individual were speaking to the first individual from the sound localization point. A composition of the materials that form the walls, floors, and ceilings would also affect reverberations, echoes, reflections, or sound decay. These physical aspects of the environment are used to determine how to artificially adjust the sound that the first individual hears so this sound emulates the sound that the first individual would hear if the sound actually originated from the second individual at the sound localization point.

Adjusting the sound for environmental conditions is different than adding sounds, such as adding background noises. Adjusting the sound for environmental conditions processes the sound so it emulates the sound that would be heard if the sound originated at the sound localization point.

Consider an example in which a binaural sound recording of a train plays to two different people. A first person is located in a winter environment with high humidity, a flat terrain, and snow on the ground. A second person is located in a summer environment with low humidity and a hilly terrain with surrounding woods. A sound localization point for each person is two kilometers away and directly in front of the person. Before being played to the first and second persons, the sound recording is processed to compensate for the environmental conditions in which the person is located.

Sound attenuation per Stoke's law will change the sound that the first person hears versus the sound that the second person hears. Attenuation of the sound is proportional to the dynamic viscosity and the square of the sound frequency, and reciprocally proportional to the fluid density and speed of sound (noting that volume viscosity also affects attenuation). Sound attenuates per the following equation:

$$A(d) = A_0 e^{-\alpha d},$$

where $A(d)$ is the amplitude of the sound wave at a given distance, $A_0$ is the amplitude of the un-attenuated sound wave, $d$ is the distance traveled, and $\alpha$ is the attenuation coefficient.

For example, sound attenuates differently according to both humidity and temperature. Dry air absorbs more acoustic energy than moist air, and sound travels faster in warmer air. Thus, given the environmental effects of humidity and temperature alone, the first and second person will hear a different sound since the recording is adjusted differently for different environmental conditions.

Furthermore, acoustic impedance for objects of different materials can be calculated with the following equation:

$$Z = pV,$$

where $Z$ is acoustic impedance of a material, $p$ is a density of the material, and $V$ is acoustic velocity.

Sound waves are also reflected at boundaries having different acoustic impedances (known as impedance mismatches). An amount of reflection of an incident wave can be calculated when the material impedances are known for materials on both sides of the boundary per the following equation:

$$R = [(Z_2 - Z_1)/(Z_2 + Z_1)]^2,$$

where $R$ is the reflection coefficient, $Z_1$ is the impedance of the first material, and $Z_2$ is the impedance of the second material.

Furthermore, sound reflection can be calculated per the following equation:

$$R = a_r/a_i,$$

where $R$ is the reflection coefficient, $a_r$ is reflected wave amplitude, and $a_i$ is the incident wave amplitude.

Values for sound adjustments can be calculated and/or estimated for real objects and real physical environments, and these numbers can be used to simulate artificial objects and artificial physical environments.

Figure 8:
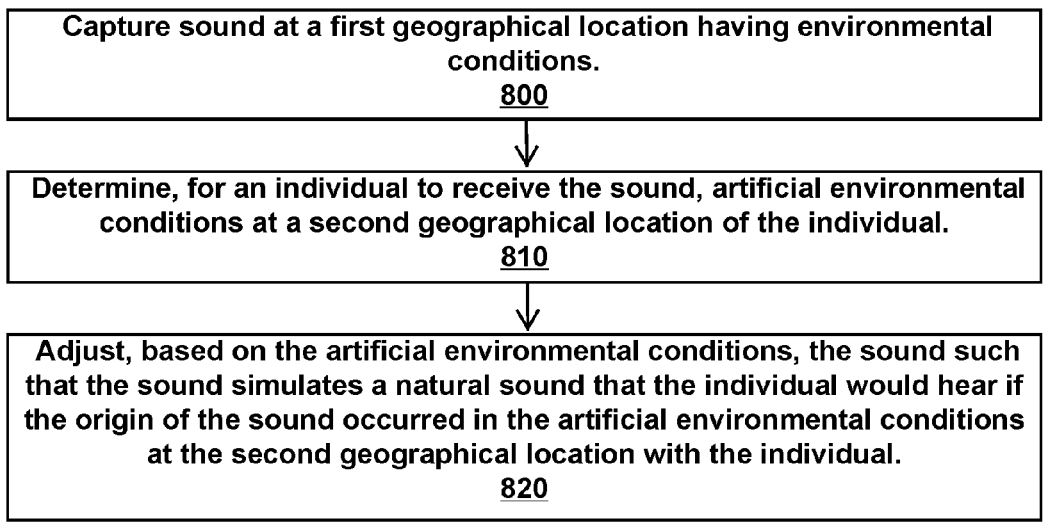
FIG. 8 is a method to adjust sound based on an artificial environment in accordance with an example embodiment.

FIG. 8 is a method to adjust sound based on an artificial environment.

Block 800 states capture sound at a first geographical location having environmental conditions.

This sound is captured at a first geographical location, such as in a room, in a building, outdoors, etc. The first geographical location has a set of physical, environmental, or ambient conditions, such as temperature, humidity, wind, terrain, elevation, objects (manmade or natural) at the location, size and/or shape of structure in which the sound is captured (e.g., if sound captured indoors as opposed to captured outdoors), etc.

Block 810 states determine, for an individual to receive the sound, artificial environmental conditions at a second geographical location of the individual.

A set of artificial environmental conditions is generated for the individual to receive the sound. These artificial environmental conditions are different than the environmental conditions where the sound was captured and/or where the individual is located. These environmental conditions are fabricated to replicate a physical environment, such as a physical environment in which the individual is not located, or a computer generated virtual environment.

Block 820 states adjust, based on the artificial environmental conditions, the sound such that the sound simulates a natural sound that the individual would hear if the origin of the sound occurred in the artificial environmental conditions at the second geographical location with the individual.

Consider an example in which a first and second individual have a telephone conversation. An electronic device captures sound from the first individual while the first individual is located in a bedroom of a house. Another electronic device provides this sound to the second individual that is located in a small cubicle in an office building. The second individual, however, desires to have the voice of the first individual localized at a distance of ten feet while the first and second individuals are standing on an ocean beach. The cubicle (having a length and width of six feet by six feet) is too small to localize the voice ten feet from the second individual and still be within the cubicle. Further, an environment of the cubicle in the office is not similar to an ocean beach environment. So, the sound is processed and adjusted such that the voice of the first individual is perceived in an artificial environment of being ten feet away from the second individual while the two individuals are standing on an ocean beach. By way of example, the sound is modified as to one or more of HRTFs, attenuation, environmental conditions, interaural level differences, interaural time differences, speed, frequency, amplitude, reflection, refraction, etc. The second individual thus hears the conversation as if the first and second individuals were standing on the beach.

Figure 9:
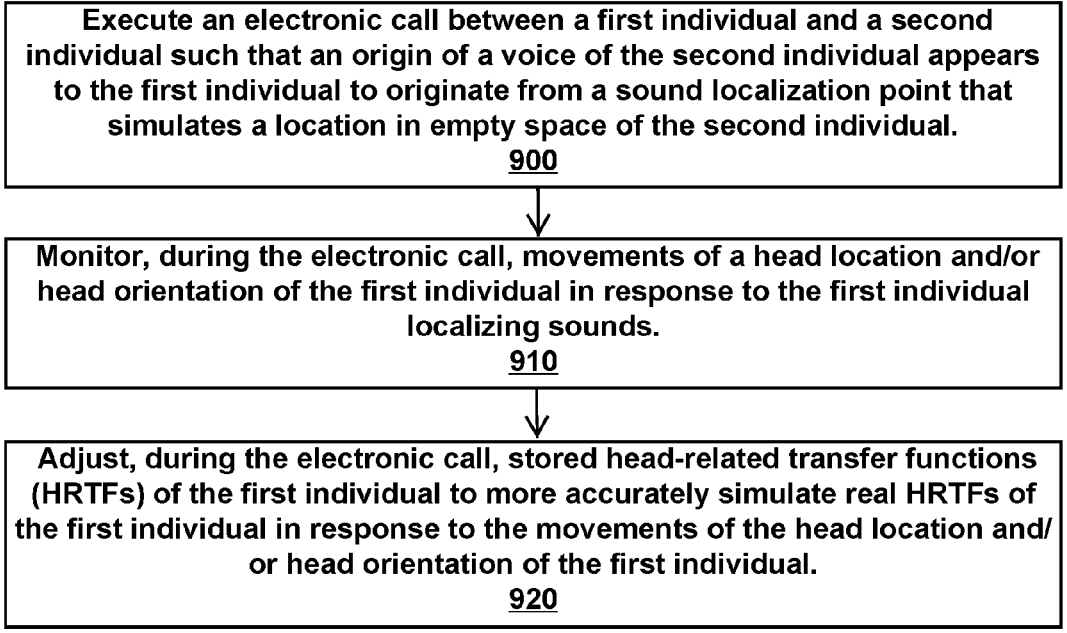
FIG. 9 is a method to adjust HRTFs of an individual during an electronic call in accordance with an example embodiment.

FIG. 9 is a method to adjust HRTFs of an individual during an electronic call.

Block 900 states execute an electronic call between a first individual and a second individual such that an origin of a voice of the second individual appears to the first individual to originate from a sound localization point that simulates a location in empty space of the second individual.

The first individual localizes a voice of the second individual at the sound localization point. The electronic call can include other sounds as well, such as ambient or environmental sounds and artificial or computer generated sounds. These other sounds can be localized at locations different than the sound localization point. For example, the first individual localizes a voice of the second individual at six feet away and simultaneously localizes voices of children playing twenty feet away and behind the sound localization point of the second individual.

Block 910 states monitor, during the electronic call, movements of a head location and/or head orientation of the first individual in response to the first individual localizing sounds.

For example, an electronic device tracks or monitors a position and/or a location of the head of the first individual. For instance, a determination is made as to whether and/or when the head turns left or right, turns up or down, or rotates back and forth. These movements can be measured with respect to a location or a position, such as measuring movements with respect to a sound localization point, measuring movements with respect to a head orientation at a particular time, measuring changes to head orientation at a specific time or during an interval of time, and measuring head orientation in response to one or more sounds being provided to the first individual. The movements in response to the sounds provided may be deliberate voluntary movements for the purpose of adjusting HRTFs or movements made for another purpose, such as a game or other activity.

Block 920 states adjust, during the electronic call, stored head-related transfer functions (HRTFs) of the first individual to more accurately simulate real HRTFs of the first individual in response to the movements of the head location and/or head orientation of the first individual. The stored HRTFs and other localization profile data may be from previous use by the individual or copied from another individual or from a database of common approximate profiles.

The HRTFs of the first individual are adjusted in real time during the electronic call to more closely match or approximate natural or real HRTFs for the first individual.

Interpolation of the angular positions for a sound source can lead to confusion or sound localization errors for the listener (e.g., front-back confusion on a sound localization point). By way of example, these errors can be corrected with real-time monitoring of head movement and orientation in response to generated sounds at sound localization points, extraction and interpretation of keywords from listener conversations, listener input, listener interpretation of the proper localization being influenced by visual stimulation such as a picture or icon representing the second individual being positioned on a visual display relative to other objects on the display so as to give clues about the spatial arrangement to the first individual as he sees the visual display, and other methods.

A sound localization point can be placed in an area known as the Cone of Confusion. The listener may localize the sound to a specific location in this Cone of Confusion, and a head orientation recorded for the angular position, θ, of this gaze. A specific set of interaural time differences (ITDs), interaural level differences (ILDs), and HRTFs can be developed for this gaze location. HRTF data set can be continually updated in real-time while a listener localizes sound in order to more closely match this HRTF data set with characteristics of the listener's anatomy.

Consider an example in which a first and a second individual engage in an electronic call. A sound localization point of a voice of the second individual appears directly in front of the first individual to emulate the two individuals facing each other. For example, the first individual is instructed to face the sound localization point that is located at an azimuth angle of zero degrees (0°). The first individual complies, but a determination is made during the electronic call that the first individual faces a position with an azimuth angle of ten degrees) (10°. Thus, a location of the perceived sound localization point (i.e., where the first individual is looking) and a location of the intended or computed sound localization point are offset by ten degrees (10°). Adjustments are made to the HRTFs of the first individual to compensate for this difference or discrepancy. With these adjustments, stored HRTFs for the first individual will more closely match or represent real, natural, or true HRTFs for the individual. After the adjustments are made to the HRTFs, the first individual will perceive the accurate position of the sound localization point of the second individual (e.g., during a subsequent electronic call between the first and second individuals).

Adjustments to HRTFs are not limited to being based on a head orientation of an individual. Consider the example in which the first and the second individual engage in the electronic call such that the sound localization point of the voice of the second individual appears directly in front of the first individual. During the call, the first individual hears children laughing behind the second individual and states, "Who are the children laughing behind you?" The laughing children, however, are not located behind the second individual, but are located in front of the second individual. The second individual responds to the question and says, "Those are my nephews; they are playing on the couch in front of me, not behind me." Keywords are extracted from this conversation to determine an error in the localization of sounds of the first individual. HRTFs of the first individual are adjusted to compensate for this error in sound localization. Here, a conversation between the first and the second individual provided information that assisted in determining how to adjust stored HRTFs for the first individual. As the accuracy of the HRTFs is improved with each call, they may be updated and stored anonymously on a worldwide public database of crowdsourced profiles.

Figure 10:
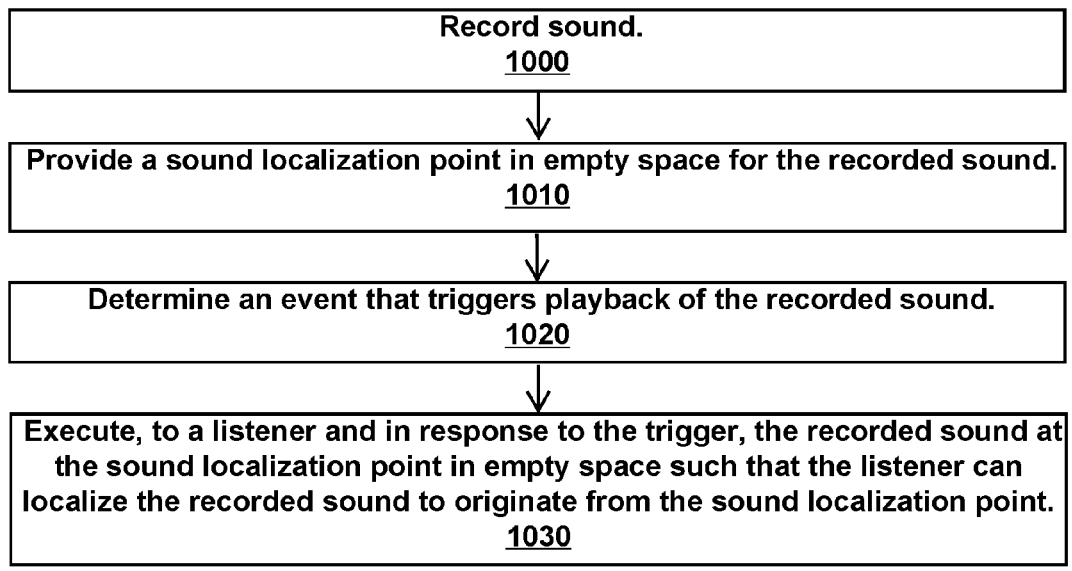
FIG. 10 is a method to execute recorded sound at a sound localization point in accordance with an example embodiment.

FIG. 10 is a method to execute recorded sound at a sound localization point.

Block 1000 states record sound.

Sound can be recorded, captured, stored, retrieved, transmitted, generated, and/or processed.

Block 1010 states provide a sound localization point in empty space for the recorded sound.

For example, the sound localization point for the sound is an origin location of where the sound was recorded. For instance, a dummy head with binaural microphones records sound that originates twenty feet away at a vertical angle of thirty degrees (30°) and a horizontal angle of south forty-five degrees east (S45° E). As another example, a computer generates binaural sound that localizes to a listener at an origin of three feet away at vertical and horizontal angles of zero degrees (0°).

Block 1020 states determine an event that triggers playback of the recorded sound.

One or more events can trigger playback, transmission, retrieval, recovery, and/or processing of the sound. By way of example, these events include, but are not limited to, an action or event that a user initiates and/or performs and an action or event that an electronic device initiates and/or performs.

Block 1030 states execute, to a listener and in response to the trigger, the recorded sound at the sound localization point in empty space such that the listener can localize the recorded sound to originate from the sound localization point.

Consider an example in which a first person wears binaural microphones and records a voice message for a second person. The first person designates a GPS location of an office room for activating the voice message that is stored on a cloud server. Later, the second person enters the designated office room, and this action triggers retrieval of the recorded voice message. The recorded voice message automatically plays for the second person upon entering the office room.

Consider an example in which a mother makes a binaural recording for her daughter. The mother designates the recording to play in the bedroom of her daughter at a trigger time of 6:00 a.m. and also designates a sound localization point that is three feet away from the bed. At 6:00 a.m. while the daughter is sleeping in her bed, the recording of the mother begins to play at the sound localization in the bedroom. The daughter localizes the sound of the recording to the sound localization point that the mother previously designated.

Figure 11:
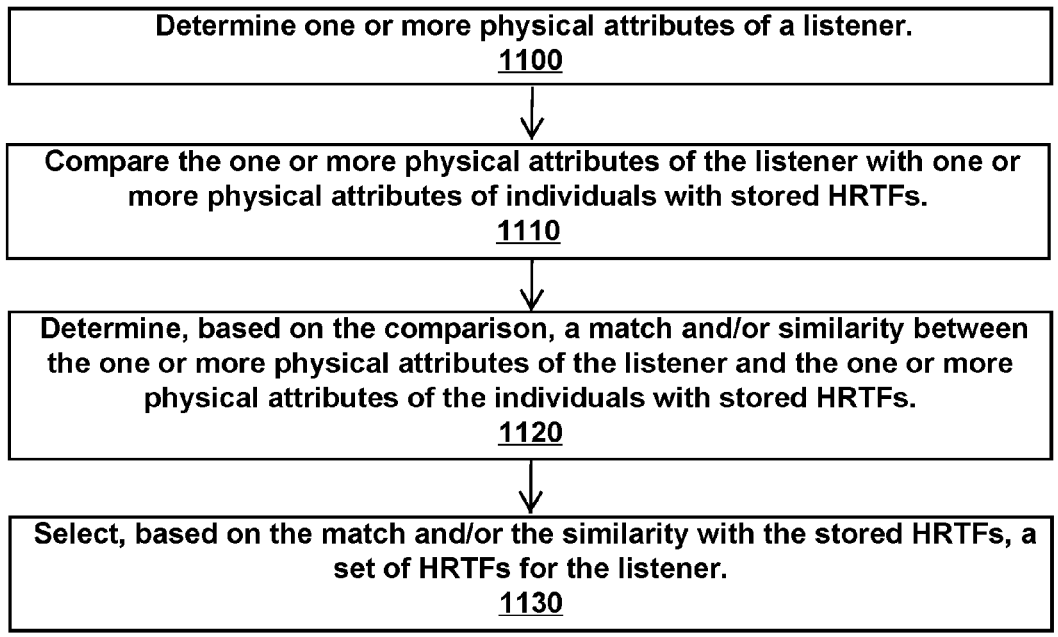
FIG. 11 is a method to select HRTFs for a listener in accordance with an example embodiment.

FIG. 11 is a method to select HRTFs for a listener.

Block 1100 states determine one or more physical attributes of a listener.

A physical attribute includes human anatomy or the structure of the human body. By way of example, physical attributes of a human include but are not limited to, appearance and position of body parts, locations of body parts, size and shape of body parts, and spatial relation of body parts with each other (e.g., a distance between two body parts).

The physical attribute can be captured, stored, processed, and/or transmitted. For example, an electronic device captures a digital image or a video frame of a physical attribute of the listener. For instance, a camera takes a picture of a face, ear, body part, or body of the listener.

Block 1110 states compare the one or more physical attributes of the listener with one or more physical attributes of individuals with stored HRTFs.

HRTFs for individuals are stored and retrievable from memory, such as an anonymous database. These HRTFs include known HRTFs that are measured or calculated from or tested and refined by individuals and dummies.

A comparison is made between one or more of the physical attributes of the listener with one or more of the physical attributes of individuals with stored and known HRTFs. For example, a comparison is made between a size and shape of a head (including the ear) of a listener with sizes and shapes of heads (including ears) of the individuals with known HRTFs.

Block 1120 states determine, based on the comparison, a match and/or similarity between the one or more physical attributes of the listener and the one or more physical attributes of individuals with stored HRTFs.

The comparison reveals a match or similarity between physical attributes of the listener and physical attributes of the individuals. For example, select one or more individuals with whom the listener has similar facial features, such as similar size and shape head and/or ears. For instance, a determination is made that the listener more closely resembles an individual having a similar face, having ears with a similar or like size, shape, and location, having a similar facial and hair profile, having common or equivalent sizes of noses, ears, mouths, etc.

Block 1130 states select, based on the match and/or similarity with the stored HRTFs, a set of HRTFs for the listener.

Individuals have a unique set of HRTFs since each individual has a unique anatomical structure and unique correlation and mapping of sound to a localization point. HRTFs for an individual can be measured or selected for the individual. Consider an example in which known HRTFs are stored for individuals in a database. These HRTFs are mapped to one or more physical attributes and/or anatomical characteristics that include, but are not limited to, a size and shape of the head, a size and a shape of a torso and shoulders, an amount and a style of hair, clothing worn (e.g., whether a person wears a hat), height, weight, etc. Physical attributes of a listener are determined, and then these physical attributes are compared with the physical attributes of the individuals with known HRTFs stored in the database. This comparison reveals a similarity or match between the listener and one or more stored individuals. Based on this similarity or match, a set of HRTFs is retrieved from the database and selected as the HRTFs for the listener. For instance, facial recognition software compares images of the head of the listener with images of heads of the stored individuals and determines a match based on similar physical features, such as head size, head shape, pinna shape and size, pinna location on the head, and facial characteristics (e.g., size, shape, and location of nose, eyes, mouth, cheeks, chin, ears, etc.). The software may also measure or estimate distances and angles of body parts and facial features based on the images or calculated from other measurements, and these measurements or the results of functions of these measurements are used to search a database for a predefined HRTF set stored from a user with similar measurements.

Consider an example in which a listener talks on a smartphone that includes a camera. When the listener moves the smartphone to her ear, the smartphone takes a picture of ear. An image of this ear is compared against a database of ear images to determine another ear having a similar or same size and shape. When a match is found, HRTFs or HRIRs for the discovered ear are retrieved and applied to the listener.

Consider an example in which a listener takes a photograph of his own face and posts the photograph to a social networking website. A facial recognition software program compares the face of the individual with stored faces with known HRTFs. A face of an individual is discovered that most closely matches anatomical features of the face of the listener. HRTFs for this individual are retrieved and provided to process sound for the listener since the two individuals have similar physical facial attributes.

Consider an example in which a near fit occurs or no suitable match is found. A user or electronic device adjusts the near fit (e.g., using a method herein), stores it, refines it over time, and provides it to a public or private database of crowdsourced profiles.

Figure 12:
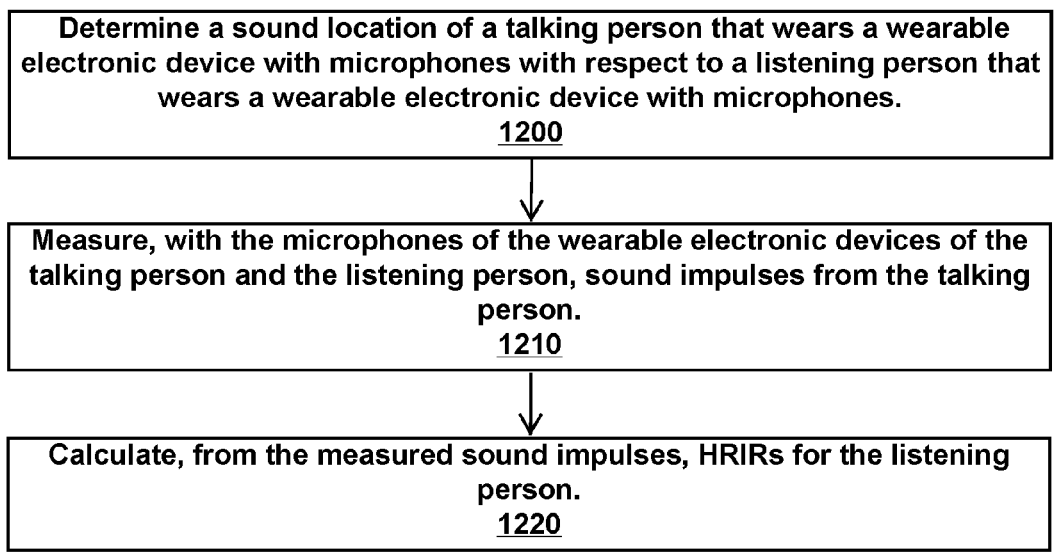
FIG. 12 is a method to calculate HRIRs for a listener in accordance with an example embodiment.

FIG. 12 is a method to calculate HRIRs for a listener.

Block 1200 states determine a sound location of a talking person that wears a wearable electronic device with microphones with respect to a listening person that wears a wearable electronic device with microphones.

Positions of one or more of the microphones, the wearable electronic devices, and the persons can be determined. For example, a distance or position between the wearable electronic devices, a location of a mouth or a point source of the sound of the talking person, horizontal and/or vertical angles between the wearable electronic devices and/or persons and/or microphones. For instance, a distance and azimuth and elevation angles are determined between the microphone of the listening person and the mouth of the talking person.

Examples of the wearable electronic device with microphones include, but are not limited to, earpieces, headphones, earphones, electronic glasses, hearing aids, and electronic devices that fit into or near the ear.

Block 1210 states measure, with the microphones of the wearable electronic devices of the talking person and the listening person, sound impulses from the talking person.

The microphone of the talking person captures sound as it exits the mouth of the talking person, and the microphone of the listening person captures sound as it travels from the mouth of the talking person to the microphone.

Block 1220 states calculate, from the measured sound impulses, HRIRs for the listening person.

One traditional method to measure HRTFs is to place microphones in a dummy or human head and then provide sound impulses from speakers to the dummy or human head. Sound impulses are provided for various azimuth angles, and the corresponding HRIRs or HRTFs are measured and calculated. This method is time-consuming since the dummy head, the human head, or the speaker is rotated for each azimuth angle so the microphone can capture different sound impulses for each angle.

In contrast to the traditional method, an example embodiment captures sound impulses from a talking person that can be stationary or moving (as opposed to capturing sound impulses from a stationary speaker). Further, such sound impulses can be captured to build a set of user-specific or customized HRIRs or HRTFs for the listening person. Further yet, the talking and listening person are not required to be at a specific location, such as a sound studio or controlled sound environment. By contrast, the sound impulses can be captured during conversations that occur during normal or ordinary life activities, such as capturing the sound impulses at a public location, at an office, in a home, in a park, etc. Ambient noise and attenuation due to environmental conditions can be filtered. Furthermore, HRIRs and HRTFs for a person can be measured and calculated over a period of time while the person engages in conversations with different people or encounters different sound sources. For instance, a set of customized HRIR or HRTF values for a person can be periodically, continually, or continuously updated or revised for the person.

A source of the sound impulses can also vary, and this source is not restricted to speakers. This source can include electronic speakers, people, and other electronic devices that the user encounters during his or her daily activity. For instance, HRIRs are captured for a person while this person wears earpieces with microphones and watches a video from a personal computer during the morning. In the afternoon, HRIRs are captured for the person while the person talks to another person that also wears earpieces with microphones. In the evening, HRIRs are captured while the person watches television at home.

Sound captured at the microphone of the talking person provides reference sound impulses for computing the HRIRs of the listening person. Changes to these sound impulses occur from interaction with the anatomy of the listening person. Although both the talking person and the listening person can contribute to transformation of the sound impulse, a comparison of these transformations can reveal what impact the listening person has on the transformation of the sound impulse. For example, HRTFs are measured at each ear of the talking and listening persons. These HRTFs describe the time delays, amplitude, tonal transformations, etc. for given azimuth and elevation angles. A sound impulse captured at the talking person has a set of HRTFs, and this sound impulse captured at the listening person has a set of HRTFs. A comparison of these sets of information reveals what changes were made to the sound impulse by the anatomy of the listening person.

Consider an example in which a talking person wears electronic glasses with speakers and microphones in or near his ears, and a listening person wears electronic glasses with speakers and microphones in or near his ears. HRIRs and HRTFs of the talking person are known. Further, head orientations of the listening person are tracked such that an azimuth angle and a vertical angle can be calculated between the mouth of the talking person (i.e., the origin of the sound impulses) and the head of the listening person. Changes to the sound impulses recorded at the microphones of the listening person provide information as to how the head, ears, and torso of the listening person affected the sound impulses. HRIRs can be calculated from these changes. Further, these recordings can be made while talking person and/or listening person move with respect to each other. The head orientation of the listening person and/or talking person are known at a given point in time, and the sound impulses at this point in time are correlated with the known head orientations.

Consider an example in which a person wears electronic earpieces that include both speakers and microphones. During a phone call, the speakers provide the person with sound from another individual on the phone call. The microphones capture a voice of the person and provide this voice to the other individual. When the person is not engaged in a phone call, the microphones capture sound from a sound source that is local to or proximate to the person. For example, this sound source is a television, a radio, a computer, a talking person, or an electronic device that produces sound. A determination is made of the head orientation of the person with respect to the sound source so the recorded sound impulses can be correlated with the head orientation of the person. For instance, a tracking device in an electronic device tracks and records head orientations and records times for these orientations. Changes to the sound impulses indicate HRIRs for the person such that user-specific HRTFs are calculated.

For example, HRTF data collection and training exercise is presented as a computer game in which sound targets of various audio frequencies are "shot" by a player actuating a trigger while pointing his head in the perceived direction of the sound. The head orientation and shots are measured during the game and correlated with the SLPs of the targets in order to improve the accuracy of the HRTFs for the player.

HRIRs can be recorded for various angles and interpolations made as to non-recorded angles. For example, azimuth angles are recorded in increments of about five degrees (5°), and angles between the recorded angles are interpolated. Further, these angles can be recorded over a period of time, such as over hours, days, weeks, months, etc. Consider an example in which a person has a conversation with a third party that functions as an origin of sound impulses. During this conversation, sound impulses are recorded for seven different azimuth angles, but these angles do not provide sufficient data to compute individualized or user-specific HRIRs for the person. The next day during a subsequent conversation with another third party, additional sound impulses are recorded for numerous other azimuth angles. Sound impulses are captured over time to build sufficient data to compute HRIRs and HRTFs that are specific to the anatomy of the listener. Data from these recordings can also be used to augment or improve existing HRIRs and HRTFs for the person.

FIGS. 13A-13D show how ITDs can be measured and calculated.

FIG. 13A shows a sound source 1300 that provides a sound wave 1310 to a listener 1320. Since the listener 1320 is directly in front of and facing the sound source 1300, the sound wave 1310 arrives at the left ear and the right ear at the same time. The ITD is zero (0) since the azimuth angle is zero degrees (0°).

FIG. 13B shows a graph 1330 of the sound wave arriving at the left ear and at the right ear at the same time. The arrival times of the sound wave at each ear are identical, and this provides an auditory clue to the listener for localizing an origin of the sound wave.

FIG. 13C shows the sound source 1300 that provides a sound wave 1350 to a listener 1320. The listener 1320 is directly in front of the sound wave 1350, but a head of the listener is rotated ninety degrees (90°) to the right such that the sound wave 1350 arrives at the left ear first and later in time at the right ear.

FIG. 13D shows a graph 1360 of the sound wave arriving at the left ear and subsequently at the right ear. The sound wave at the right ear is offset by an amount of time required for the sound wave to travel to the right ear. This offset is about 0.6-0.7 milliseconds (msec).

The ITD is dependent on the speed of sound and a difference in distance the sound travels to reach both ears. When a head of the listener is rotated ninety degrees (90°) with respect to the direction of the sound, then this distance (D) represents a width of the head of the listener.

The ITD can be calculated or estimated knowing information such as the speed of sound, width of the head of the listener, and angle of rotation of the head or head orientation with respect to the direction of the sound wave. By way of example, if the speed of sound is 761 miles per hour (mph), the width of the human head is seven inches (7″), and the head is rotated ninety degrees (90°) with respect to the direction of the sound such that the sound strikes the left ear first, then it would take approximately 0.63 milli-seconds (msec) for the sound to travel from the left ear to the right ear (using a hypothetical instance in which the sound propagated to the right ear in a straight line and using the formula of distance (D) equals rate (R) times time (T), or D=R×T). More specifically, the change in time is given by the following equation:

$$\Delta T = D \sin \theta / R,$$

where $\Delta T$ is the arrival time difference between two ears, D is the distance between the two ears, $\theta$ is the angle of arrival of the sound from the source, and R is the speed of sound.

This equation does not take into account that sound travels around the head, and this added distance causes additional delay. If an assumption is made that the head is spherical, then the ITD is given by the following equation:

$$ITD = r(\theta + \sin(\theta))/R,$$

where ITD is the interaural time delay, r is half the distance between the ears, $\theta$ is the angle of arrival of the sound from the source, and R is the speed of sound.

Figure 14:
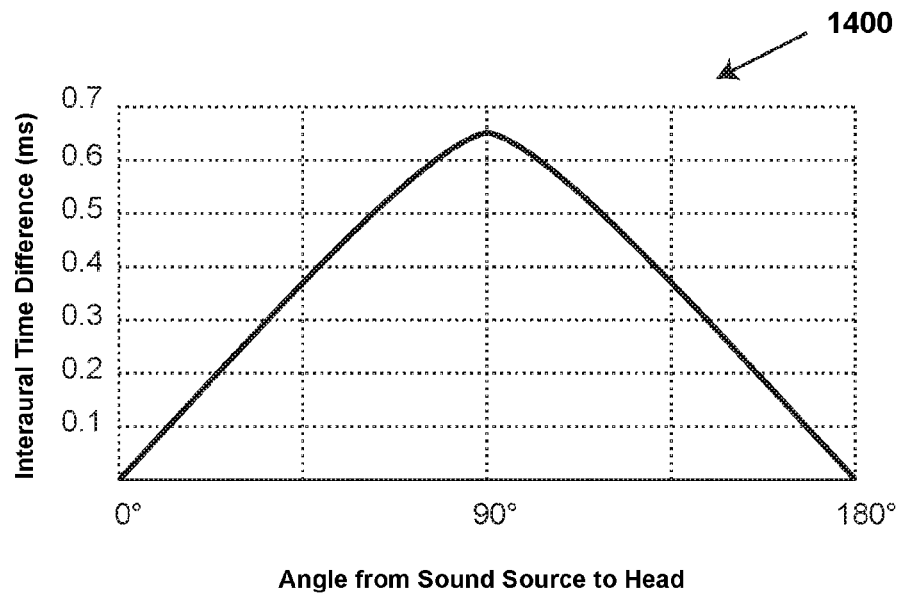
FIG. 14 is a graph of ITDs for various head orientations with respect to a propagation direction of the sound wave in accordance with an example embodiment.

FIG. 14 shows a graph 1400 of ITDs for various head orientations with respect to a propagation direction of the sound wave. The X-axis shows angles from the sound source to the head, and the Y-axis shows interaural time differences in milliseconds. This data can be stored and retrieved to assist in executing example embodiments.

An interaural level difference (ILD) represents a difference in sound pressure levels at each ear. When the head of the listener is rotated with respect to the propagation direction of the sound wave, then each ear receives a different sound pressure level from the impacting sound wave. The head of the listener creates an acoustic shadow between the two ears. An amount of ILD depends on the head orientation and on a frequency of the sound wave since higher frequency sound waves attenuate more readily than lower frequency sound waves.

Figure 15:
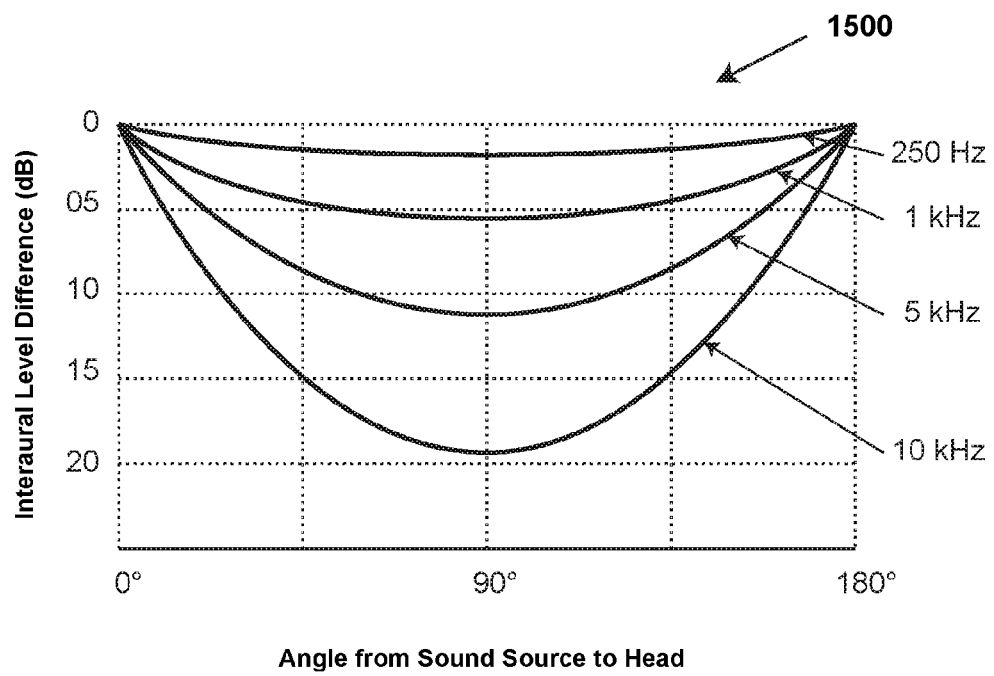
FIG. 15 is a graph of ILDs for various sample frequencies across head orientations from 0° to 180° with respect to a propagation direction of a sound wave in accordance with an example embodiment.

FIG. 15 shows a graph 1500 of ILDs for various sample frequencies across head orientations from 0° to 180° with respect to a propagation direction of a sound wave. The X-axis shows angles from the sound source to the head, and the Y-axis shows interaural level differences in decibels (dBs). This data can be stored and retrieved to assist in executing example embodiments.

The ears, face, and head of people alter the amplitude and phase of sound waves entering each ear. Changes to these waves from the anatomy of the human body are calculated as head-related transfer functions (HRTFs). HRTFs can be measured (e.g., using microphones in ears) and/or mathematically computed and modeled for various locations in space. For example, an HRTF is calculated and stored for azimuth and vertical positions around the head.

HRTFs are functions of frequency and three spatial variables. In far field distances greater than about one meter, the HRTF attenuates inversely with range and can be measured and/or mathematically estimated. Once HRTFs are known or calculated for discreet angular increments (such as increments of fifteen degrees (15°) in the azimuth position), HRTFs can be estimated or interpolated for other angular positions (e.g., other angular positions, θ, in the far field HRTF of H(f, θ, φ)).

HRTFs (or head-related impulse responses (HRIRs) in the time domain) can be obtained from measurements of the listener at various angles or obtained from mathematical modeling. For example, a microphone is placed in or near an ear or ear canal of a person to record binaural pressures. A grid of HRIRs at various locations in space around a listener can be used to move the sound localization point around the listener. The Fourier transform of the HRIRs, h(t), for an impulse at a source generates the HRTFs, H(f), that enable source localization. HRTFs for the left and right ear can be stored and processed to synthesize binaural signals from a sound source.

Binaural synthesis transforms a sound source with no positional information to a virtual sound source with respect to a head of a listener. As the listener moves with respect to the sound localization point, HRTFs are changed in response to these movements. Calculations are made with respect to the relative position and head orientation of the listener with respect to the sound localization point or the imaginary point where the listener should be localizing the sound. HRTFs can be retrieved and/or calculated based on the known relative position and head orientation of the listener with respect to the SLP.

By way of example, binaural synthesis involves convolving a mono sound with HRIRs to generate a synthetic binaural signal that includes directional information of the sound source. This directional information is included in the HRTFs. By way of example, the sound waves are adjusted with a convolving process that applies a Discreet Fourier Transform (DFT) of the HRTF. For instance, the sound waves are multiplied with a specific period signal, such as a square signal known as the Opening. Consider an example in which a sound card includes one or more digital to analog converters (DACs) that implement a sound conversion algorithm to place sounds at locations around the listener. One or more operational amplifiers (op-amps) transform an output current from the DACs into a drive voltage provided to an amplifier and speakers.

Sound waves can thus be captured, processed, and altered with HRTFs to change sound properties before being provided to a listener. Upon hearing the artificially altered sound wave, the listener will believe that the sound originates from a location different than the real location.

Example embodiments include two-channel and multi-channel structures to achieve sound localization. In a two-channel structure, digital signal processing (DSP) provides sound to a listener through two speakers or earpieces, and in a multi-channel structure, two or more speakers are placed around and/or near a listener. In the two-channel structure, impulse response filters are characterized according to the HRIRs. These HRIRs can be generic (or general) HRIRs or user-specific (or customized or individualized) HRIRs. Generic HRIRs can be obtained from a dummy or manikin head with microphones, created or generated from a computer model, or obtained from a population sample (e.g., a database of HRIRs of individuals used to represent a general population of listeners). User-specific HRIRs can be obtained from measurements of the individual listener (e.g., providing microphones in ears of the individual, calculating HRIRs from a size and shape of a head, ears, etc. of the individual).

Furthermore, HRIRs can be obtained from a combination of generic and user-specific techniques. Consider an example in which initial HRIRs are retrieved from a database of a user having similar facial features and then adjustments are made to the HRIRs based on measured responses of the individual to sound localizations. Consider another example in which HRIRs are obtained from a database for various measured azimuth and elevation angles. HRIRs for non-measured angles (i.e., those angles between the measured azimuth and elevation angles) can be actually measured or interpolated (e.g., using an HRIR interpolation algorithm, such as a bilinear interpolation model, a triangular interpolation model, spherical splines filtering model, a weighted-average model, or a spectral interpolation model). For instance, once the HRIRs are retrieved, measurements from the listener are made over days and/or weeks to provide missing HRIRs to the set of HRIRs retrieved from the database. As time proceeds, more and more HRIRs are added that provide a more accurate mapping of customized HRIRs to the listener.

Figure 16:
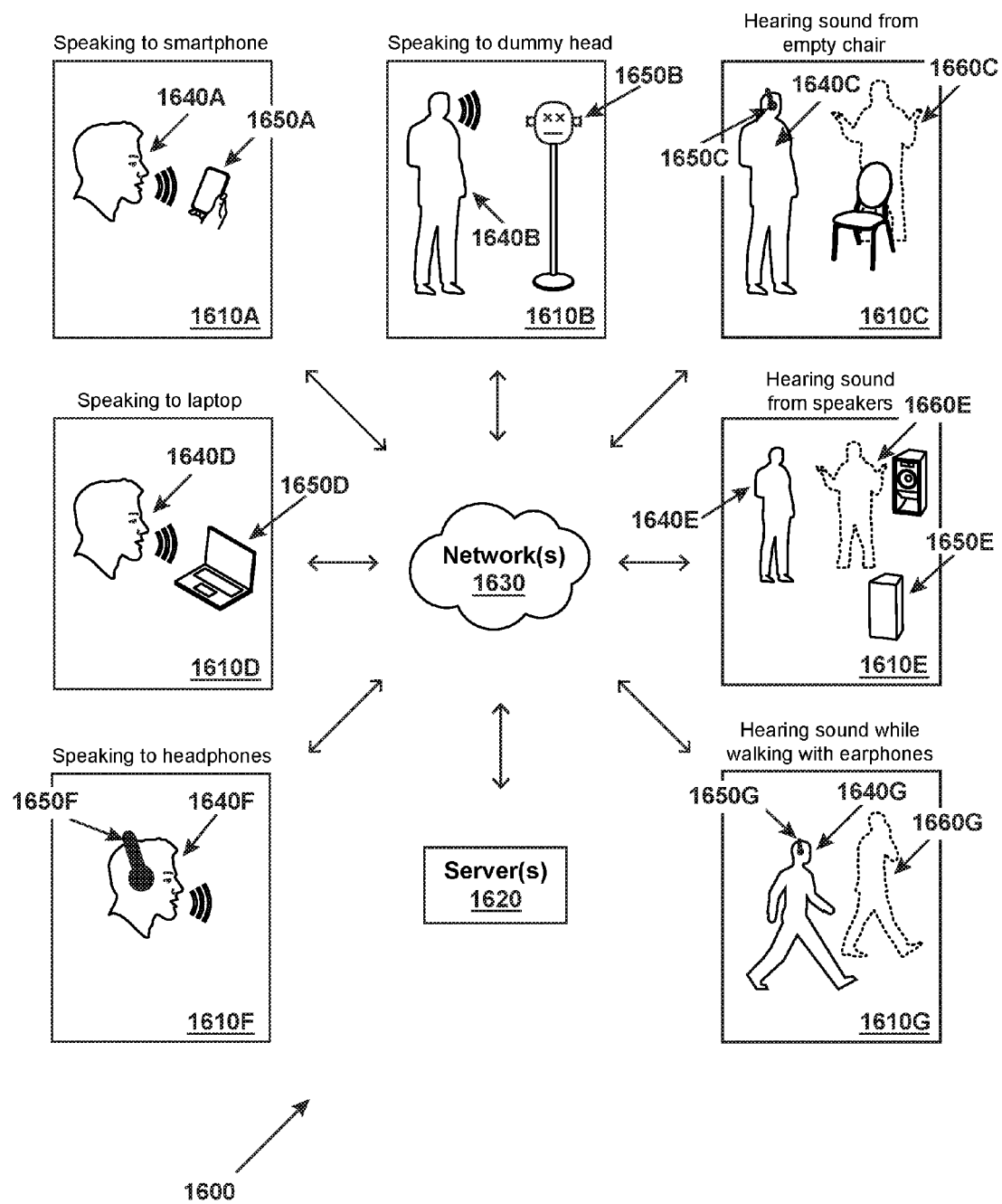
FIG. 16 is an electronic system that includes users and electronic devices at different geographical locations in accordance with an example embodiment.

FIG. 16 is an electronic system 1600 that includes users and electronic devices at different geographical locations 1610A-1610G and one or more servers 1620 in communication with each other through one or more networks 1630. Geographic location 1610A shows a speaking person 1640A communicating through a smartphone 1650A. Geographic location 1610B shows a speaking person 1640B communicating to a dummy head 1650B with microphones as earpieces. Geographic location 1610C shows a listening person 1640C hearing sounds from a person on a wearable electronic device 1650C. Sounds from this person are localized at a sound localization point 1660C at a chair. Geographic location 1610D shows a speaking person 1640D communicating through a notebook computer 1650D. Geographic location 1610E shows a listening person 1640E hearing sounds from a third party through speakers 1650E. Sounds from the third party are localized at a sound localization point 1660E that occurs in front of the listening person 1640E. Geographic location 1610F shows a person 1640F hearing sounds through and speaking sounds to a wearable electronic device 1650F. Geographic location 1610G shows a listening person 1640G hearing sounds from a third party on a wearable electronic device 1650G while the listening person walks. Sounds from the third party are localized at a sound localization point 1660G that occurs in front of the listening person.

Figure 17:
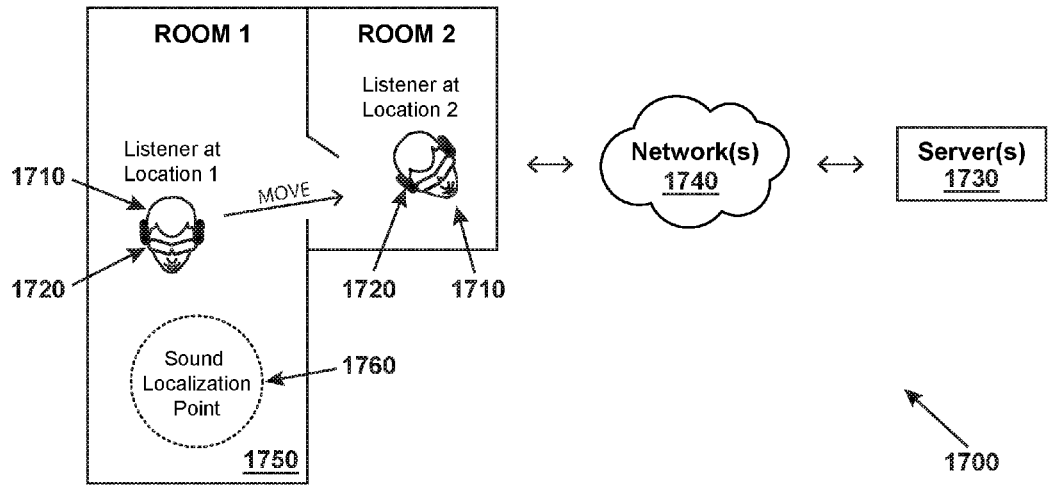
FIG. 17 is an electronic system that includes a listener wearing a wearable electronic device in accordance with an example embodiment.

FIG. 17 is an electronic system 1700 that includes a listener 1710 wearing a wearable electronic device 1720 that communicates with one or more servers 1730 through one or more networks 1740. The listener 1710 is initially located in room 1, and speakers in the wearable electronic device 1720 provide sound to the listener. Sound from the wearable electronic device 1720 localizes in front of the listener at a sound localization point 1760 that is empty space located in room 1. As the listener 1710 moves to room 2, the sound localization point 1760 remains fixed at the location in room 1. Sound that the listener hears changes as a location and a head orientation of the listener also changes. The location and the head orientation of the listener are tracked with the wearable electronic device 1720 so the sound can be adjusted with movements of the listener and continue to appear to originate from the sound localization point as the listener moves.

Consider an example in which a music band plays a live performance at a venue in New York City. Binaural sounds of the band playing are sold to listeners that are located in other cities throughout the United States. Listeners can purchase virtual attendance tickets to the performance. These tickets enable a listener to receive sound of the performance in real-time at a designated sound localization point that represents a location of a seat or location at the venue. Listener 1710 purchases a ticket that provides a virtual front row seat that the listener localizes in room 1 at the sound localization point 1760. Listener 1710 receives the sound through speakers in the wearable electronic device 1720 as if the listener were seated in the front row at the venue in New York City during the live performance. Sound that the listener 1710 hears automatically adjusts to compensate for changes to the head orientation and the location of the listener as the listener moves about rooms 1 and 2. For example, amplitude and localization cues (e.g., ITD and ILD) change in real-time as the listener 1710 moves from room 1 to room 2. Further, the wearable electronic device 1720 can provide the listener with images and/or video that correspond to the band playing at the venue. For instance, the listener 1710 sees through a display of the wearable electronic device 1720 a real-time image of the band from a front row seat at the venue corresponding to the ticket purchased.

Consider an example in which a sound localization point is located in one room with a listener, and the listener then moves into an adjacent room and closes a door between the two rooms. A reduction of sound can be calculated between the two rooms or for virtual rooms in which the listener appears to move from one room to another room according to the following equation:

$$SPL(\text{Receiving Room}) = SPL(\text{Source Room}) - STL - 10 \log(SA/A),$$

where SPL (Receiving Room) is the sound pressure level in the receiving room, SPL (Source Room) is the sound pressure level in the source room, STL is the sound transmission loss of the wall between the two rooms, SA is the sound absorption in the receiving room, and A is the surface area of the wall between the two rooms.

Figure 18:
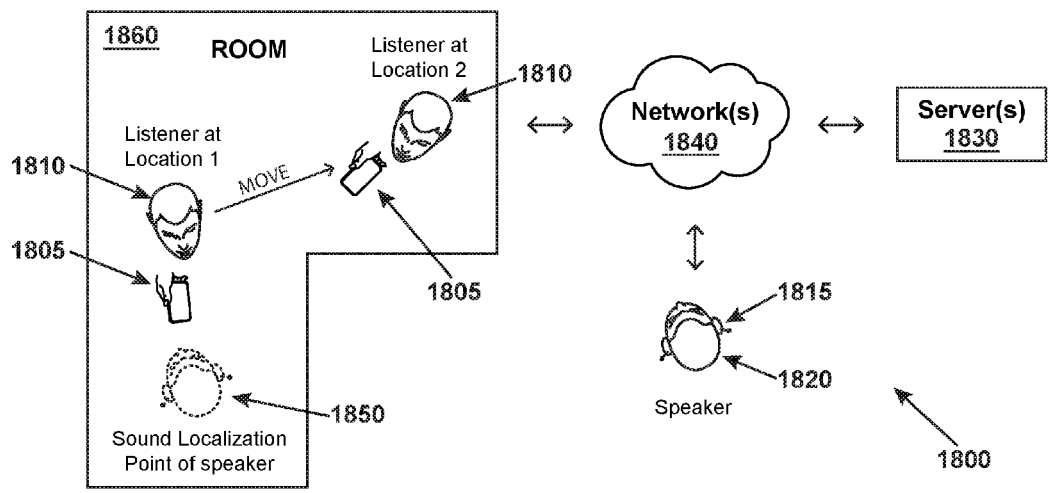
FIG. 18 is an electronic system in which electronic devices of two individuals communicate during an electronic call in accordance with an example embodiment.

FIG. 18 is an electronic system 1800 that includes a handheld portable electronic device (HPED) 1805 of a listener 1810 and a wearable electronic device 1815 of a speaker 1820 that communicate during an electronic call over one or more servers 1830 and one or more networks 1840. The wearable electronic device 1815 of the speaker 1820 captures binaural sound, and the HPED 1805 provides this sound to the listener such that the listener localizes a voice of the speaker 1820 to a sound localization point 1850. The HPED 1805 and the wearable electronic device 1815 can include position and orientation tracking systems to track locations and head orientations of the listener 1810 and the speaker 1820.

The sound localization point 1850 has a size, a shape, and an orientation of a head that emulates a size, a shape, and an orientation of a head of the speaker 1820. When the speaker 1820 moves his head (such as changing location, yaw, pitch, or roll), then a head of the sound localization point 1850 simultaneously changes to emulate or copy this movement. A direction or source of the sound from the sound localization point emulates sound from the mouth of the speaker 1820. For instance, if the speaker 1820 rotates his head and mouth twenty degrees (20°) left, then the head and mouth of the virtual head of the sound localization point 1850 contemporaneously rotates twenty degrees (20°) left. This rotation changes the sound that the listener hears even though the listener may be hearing the sound through headphones, an earpiece, or speakers that are not actually located at the sound localization point 1850.

When the listener 1810 moves his head with respect to the sound localization point 1850 (such as changing location, yaw, pitch, or roll), then adjustments are simultaneously made to the sound of the voice of the speaker to compensate for these movements. These adjustments change the sound so the sound that the listener hears emulates the sound that the listener would hear if the speaker were physically present at the sound localization point 1850. For instance, the listener 1810 continues to hear the voice of the speaker 1820 at the sound localization point as the listener moves from location 1 in the room 1860 to location 2 in the room 1860.

The sound localization point 1850 can also represent a location where sound of the listener is captured with the electronic device 1805. In other words, the sound localization point 1850 can also include a virtual recording point (VRP) or a virtual microphone point (VMP). Microphones in or associated with the electronic device 1805 capture spoken sound from the listener 1810 (e.g., capture the sound at the head of the listener or at the body of the electronic device). This sound, however, is adjusted so it sounds to the speaker 1820 as if it were captured at another location (such as the virtual microphone point that, in this instance, is the sound localization point 1850). As such, sound that the speaker 1820 hears changes in real-time to compensate for movements of the listener 1810 as the listener talks and moves with respect to the sound localization point 1850 since this point is also a virtual microphone point. For example, as the listener 1810 moves from location 1 to location 2, an amplitude of the sound provided to the speaker 1820 decreases since a distance of the listener 1810 from the sound localization point 1850 increases.

Figure 19:
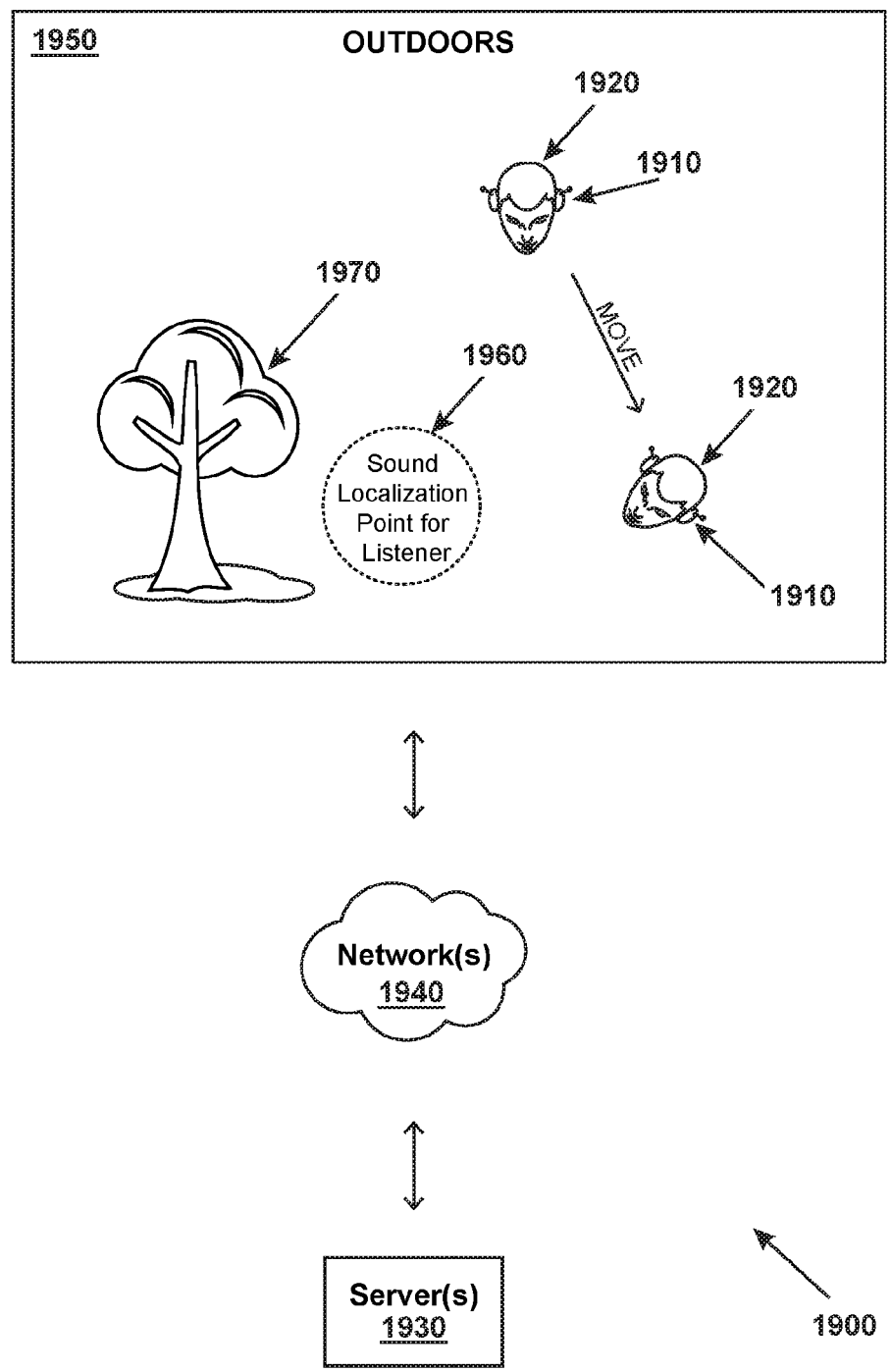
FIG. 19 is an electronic system that includes a wearable electronic device of an individual in accordance with an example embodiment.

FIG. 19 is an electronic system 1900 that includes a wearable electronic device (WED) 1910 of an individual 1920 that communicates with one or more servers 1930 through one or more networks 1940 while the individual 1920 is located outdoors 1950. A sound localization point 1960 exists near a tree 1970.

The sound localization point 1960 represents a location to where the individual 1920 localizes sound received through the wearable electronic device 1910. Sounds that transmit through the wearable electronic device 1910 appear to the individual 1920 to originate at the sound localization point 1960. For instance, a voice of a third person wirelessly transmits to the wearable electronic device 1910 over the Internet or an outdoor wireless network.

Figure 20:
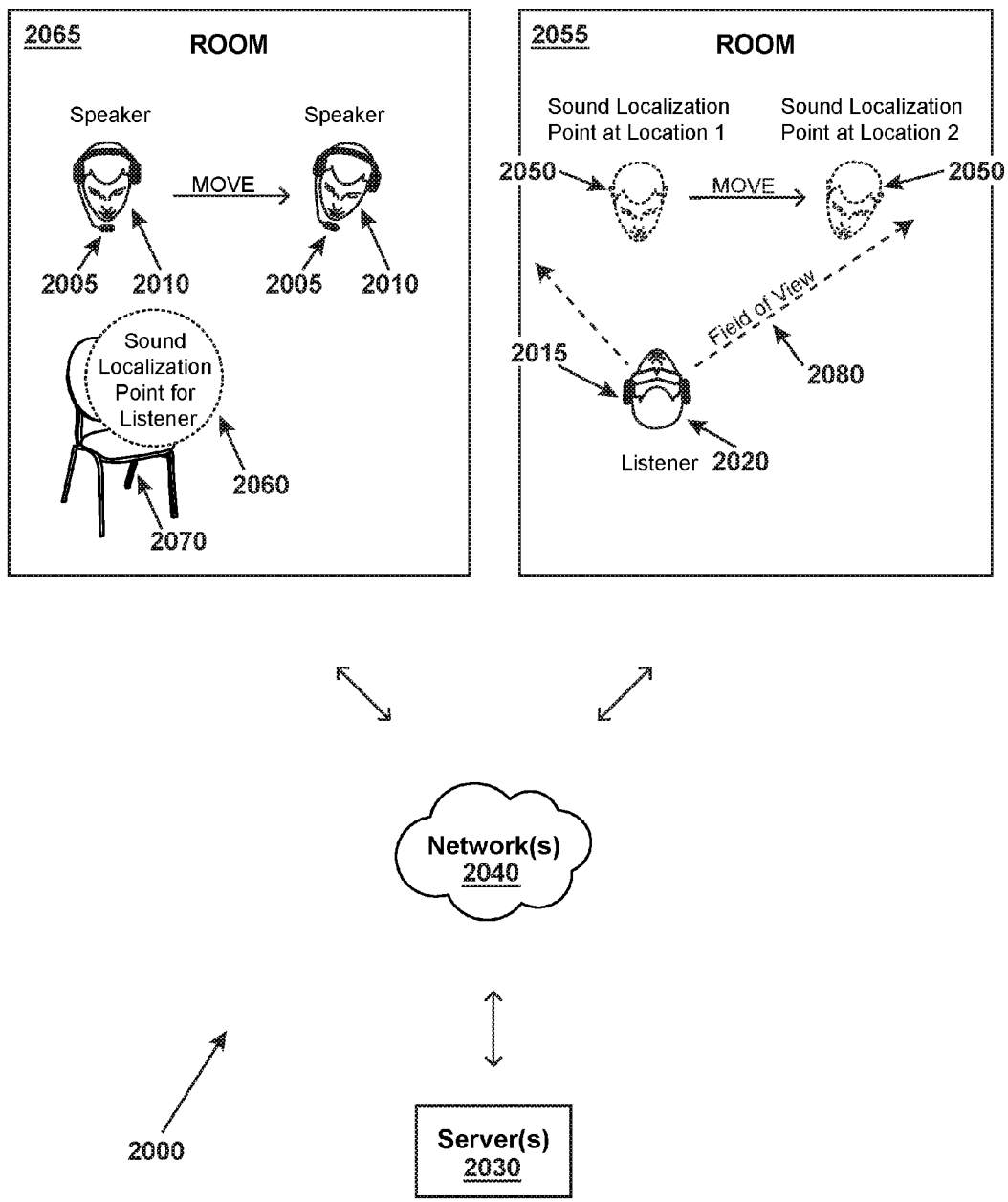
FIG. 20 is an electronic system in which electronic devices of two individuals communicate during an electronic call in accordance with an example embodiment.

FIG. 20 is an electronic system 2000 that includes a wearable electronic device (WED) 2005 of a first person or speaker 2010 and a wearable electronic device (WED) 2015 of a second person or listener 2020 that communicate during an electronic call over one or more servers 2030 and one or more networks 2040. The wearable electronic device 2005 of the speaker 2010 captures binaural sound and transmits sound to the listener 2020 who localizes the sound at a sound localization point 2050 located in a room 2055. The wearable electronic device 2015 of the listener 2020 captures binaural sound and transmits sound to the speaker 2010 who localizes the sound at a sound localization point 2060 located in a room 2065 that is remote from the room 2055. A voice of the speaker 2010 localizes to the sound localization point 2050 for the listener 2020, and a voice of the listener 2020 localizes to the sound localization point 2060 for the speaker. The sound localization point 2060 localizes to an empty chair 2070 located in room 2065.

The sound localization point 2050 tracks or follows movements in real-time of the speaker 2010. When the speaker 2010 changes his head orientation or moves his body, a head orientation or location of the sound localization point 2050 simultaneously moves to emulate and coincide with movements of the speaker 2010. For example, when the speaker 2010 moves to his left (as shown in room 2065), the sound localization point 2050 moves with an equal distance and an equal direction in room 2055. For instance, when the speaker 2010 rotates and tilts his head fifteen degrees (15°), then the virtual head that represents the sound localization point 2050 also rotates and tilts fifteen degrees (15°) in a same direction. These movements change the sound that the listener 2020 hears the speaker 2010 speaking during a telephone call.

For the speaker 2010, a voice of the listener 2020 originates from the chair 2070 in a manner that simulates the listener 2020 sitting in the chair even though the chair is physically empty and no sound actually originates from the chair. The sound that the speaker 2010 hears originates from the wearable electronic device 2005.

For the listener 2020, a voice of the speaker 2010 originates from the sound localization point 2050 that can exist in empty space in room 2055 (such as existing at a single point in space or an area or volume in empty space or occupied space). This sound localization point 2050 can appear to the listener 2020 as a virtual image of the speaker 2010. For example, the wearable electronic device 2015 is a pair of electronic glasses with a display that provides an image or video of the speaker 2010 in a field of view 2080 of the listener 2020. This image represents the sound localization point 2050 so the listener 2020 can see the sound localization point 2050 as it moves in the room 2055.

Figure 21:
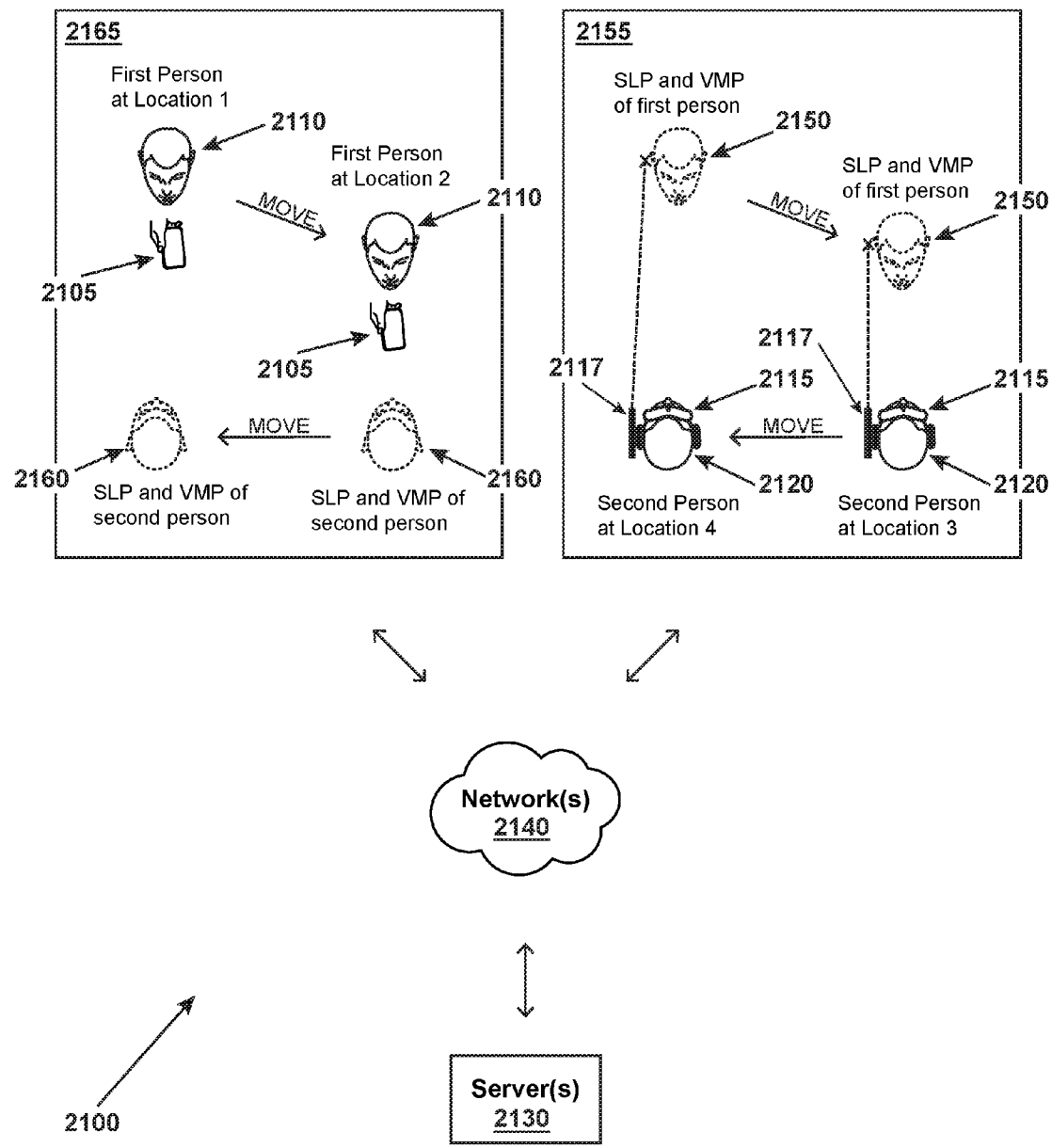
FIG. 21 is an electronic system in which electronic devices of two individuals communicate during an electronic call in accordance with an example embodiment.

FIG. 21 is an electronic system 2100 that includes a handheld portable electronic device (HPED) 2105 of a first person 2110 and a wearable electronic device (WED) 2115 of a second person 2120 that communicate during an electronic call using one or more servers 2130 and one or more networks 2140. The HPED 2105 of the first person 2110 captures sound and provides this sound to the second person 2120 who localizes the sound at a sound localization point (SLP) 2150 located at a geographical location 2155. The WED 2115 of the second person 2120 captures sound using a laser microphone and provides this sound to the first person 2110 who localizes the sound at a sound localization point (SLP) 2160 located at another geographical location 2165 that is remote from geographical location 2155. A voice of the first person 2110 localizes to the sound localization point 2150, and a voice of the second person 2120 localizes to the sound localization point 2160.

A sound localization point can also be a virtual recording point (VRP) or a virtual microphone point (VMP) that is a virtual location where sound is captured or recorded. Sound is captured or recorded with one or more electronic microphones at a first geographical location or first point and processed so the sound appears to be captured or recorded at a second geographical location or second point that is the virtual point. For example, the first person 2110 holds an HPED 2105 that captures, records, and transmits sound (such as a voice of the first person). The HPED 2105 captures, records, and transmits this sound at or near the body of the first person 2110 since the first person holds the HPED in his hand or wears it on his body. Properties of this sound, however, are changed so that the sound appears to have been captured at a virtual microphone point (VMP) 2160 that is located with the SLP and away from the first person 2110. For instance, the SLP and VMP are located several feet in front of the first person as shown at location 2165. The second person 2120 does not hear or localize the voice of the first person 2110 as being captured at the HPED 2105, but instead hears or localizes the sound as being captured at the VMP that is a location away from the first person.

The second person 2120 wears a WED 2115 that captures, records, and transmits sound (such as a voice of the second person). The WED 2115 captures, records, and transmits this sound at the head of the second person 2120 since the second person wears the WED (such as wearing a pair of electronic glasses). Properties of this sound, however, are changed so that the sound appears to have been captured at a virtual microphone point (VMP) 2150 that is located with the SLP and away from the second person 2120. For instance, the SLP and VMP are located several feet in front of the second person as shown at location 2155. The first person 2110 does not hear or localize the voice of the second person 2120 as being captured at the WED 2115, but instead hears or localizes the sound as being captured at the location away from the second person.

Sound can also be captured using a physical method to measure the sound impulses at a remote point, such as using a laser microphone or a device that uses a laser beam and smoke or vapor to detect sound vibrations in air. For example, the second person 2120 wears the WED 2115 that captures, records, and transmits sound (such as the voice of the second person). The WED 2115 records and transmits this sound at the head of the second person 2120 since the second person wears the WED (such as wearing a pair of electronic glasses with a laser microphone). Sound is captured not at the location of the WED 2115, but at the SLP and VMP 2150 since a laser microphone 2117 is trained on a surface or on smoke or vapor in air at the SLP and VMP located away from the second person. For instance, the SLP and VMP are located several feet in front of the second person. As such, the first person 2110 does not hear or localize the voice of the second person 2120 as being captured at the WED 2115, but instead hears or localizes the sound as it was detected at the location 2150 away from the second person.

The VMP and the SLP can be located at a same point or area or located at different points or areas. For example during an electronic telephone call between a first person and a second person, the first person localizes sound from the second person at a sound localization point that is eight feet directly in front of a head of the first person. A VMP for the first person, however, is located three feet in front of the first person. In this instance, the first person hears the second person as being eight feet in front of the first person, but the second person hears the first person as being three feet in front of the second person.

A listening person, a speaking person, another person, and an electronic device can establish locations for the VMP and SLP. Conflicts between locations can be resolved according to established rules, defaults, or hierarchies. For example during a telephone call, a listening person has priority to establish a location of a SLP for a voice of the talking person.

Consider an example in which John telephones Paul. An electronic device of John establishes a sound localization point for the voice of Paul to be five feet in front of John and a virtual microphone point for the recording of the voice of John to be five feet in front of John. The electronic device of John sends the locations of the SLP and the VMP to the electronic device of Paul. These two electronic devices handshake and agree on the SLP and VMP locations.

An electronic device tracks or follows movements in real-time of the speaker or sound source with respect to the virtual microphone point. When the speaker changes his head orientation or moves his body, the sound is adjusted to compensate for these movements. For example, when the speaker moves away from the virtual microphone point, an amplitude of the sound reduces since a distance between the speaker and the virtual microphone point increased. Further, an ITD and an ILD of the sound change in response to movements of the head and body of the speaker in order to emulate sound that real microphones would capture if they were located at the virtual microphone point.

FIG. 21 shows the first person 2110 at location 2165 moving from location 1 to location 2. In response to this movement, the SLP and VMP 2150 of the first person move an equivalent direction and distance at location 2155. Further, the second person 2120 at location 2155 moves from location 3 to location 4. In response to this movement, the SLP and VMP 2160 of the second person move an equivalent direction and distance at location 2165.

Figure 22:
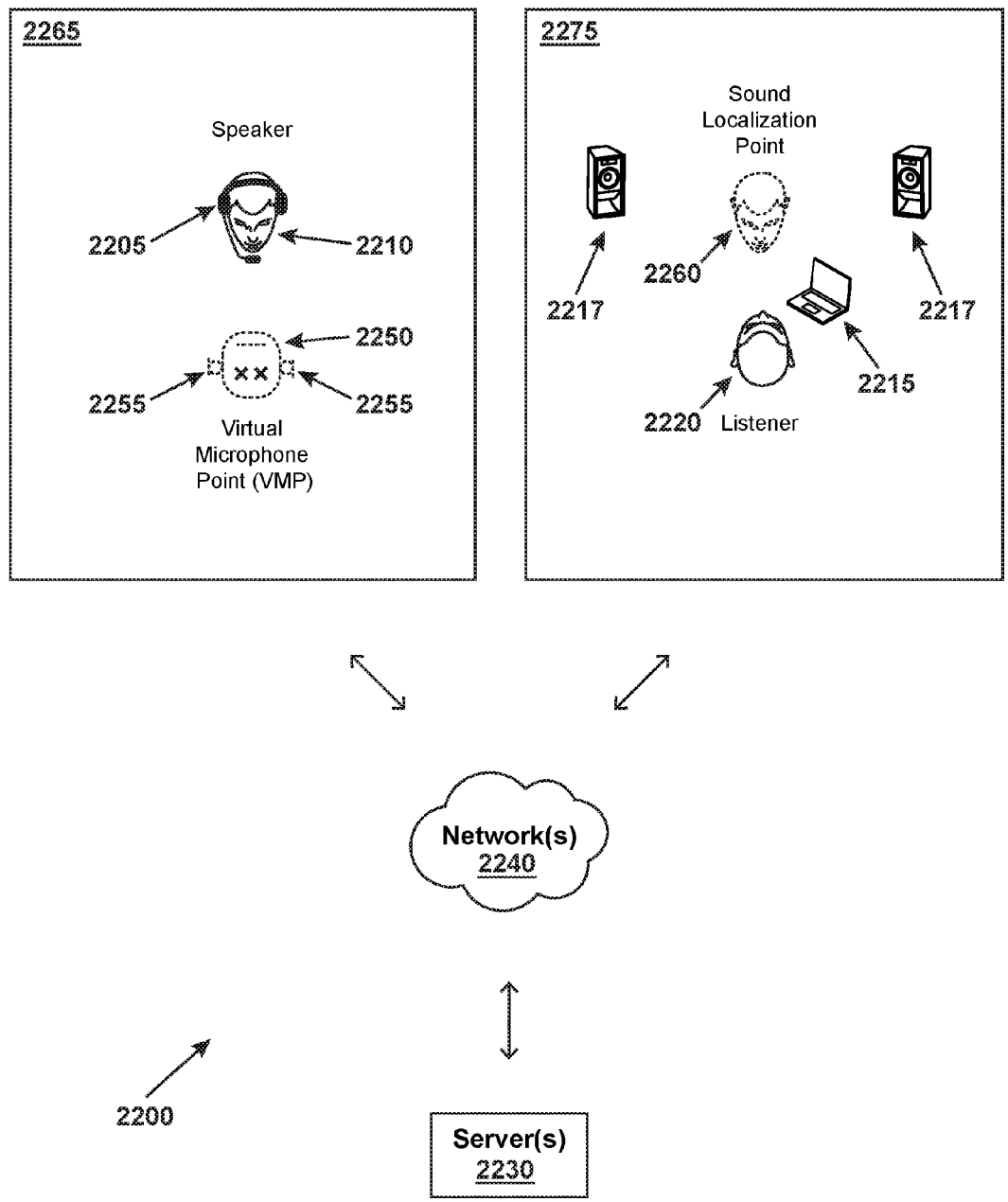
FIG. 22 is an electronic system in which electronic devices of two individuals communicate during an electronic call in accordance with an example embodiment.

FIG. 22 is an electronic system 2200 that includes a wearable electronic device (WED) 2205 of a speaker 2210 at a first location 2265 and a computer 2215 in communication with speakers 2217 near a listener 2220 at a second location 2275 that communicate during an electronic call using one or more servers 2230 and one or more networks 2240. The WED 2205 captures sound at two microphones located in or near ears of the first person 2210. The sound is adjusted or changed so that the sound appears to be captured at a virtual microphone point 2250 that is located several feet in front of the speaker 2210. This virtual microphone point includes two virtual microphones 2255 located on a virtual dummy head of the virtual microphone point 2250. The computer 2215 and speakers 2217 present and record the sound such that the listener 2220 localizes the sound at a sound localization point 2260 that also represents the virtual microphone point.

Consider an example in which a distance between the speaker 2210 and the virtual microphone point 2250 is equivalent to a distance between the listener 2220 and the sound localization point 2260. When the speaker 2210 moves with respect to the virtual microphone point 2250, the sound localization point 2260 simultaneously moves with equivalent speed and direction with respect to the listener 2220.

Figure 23:
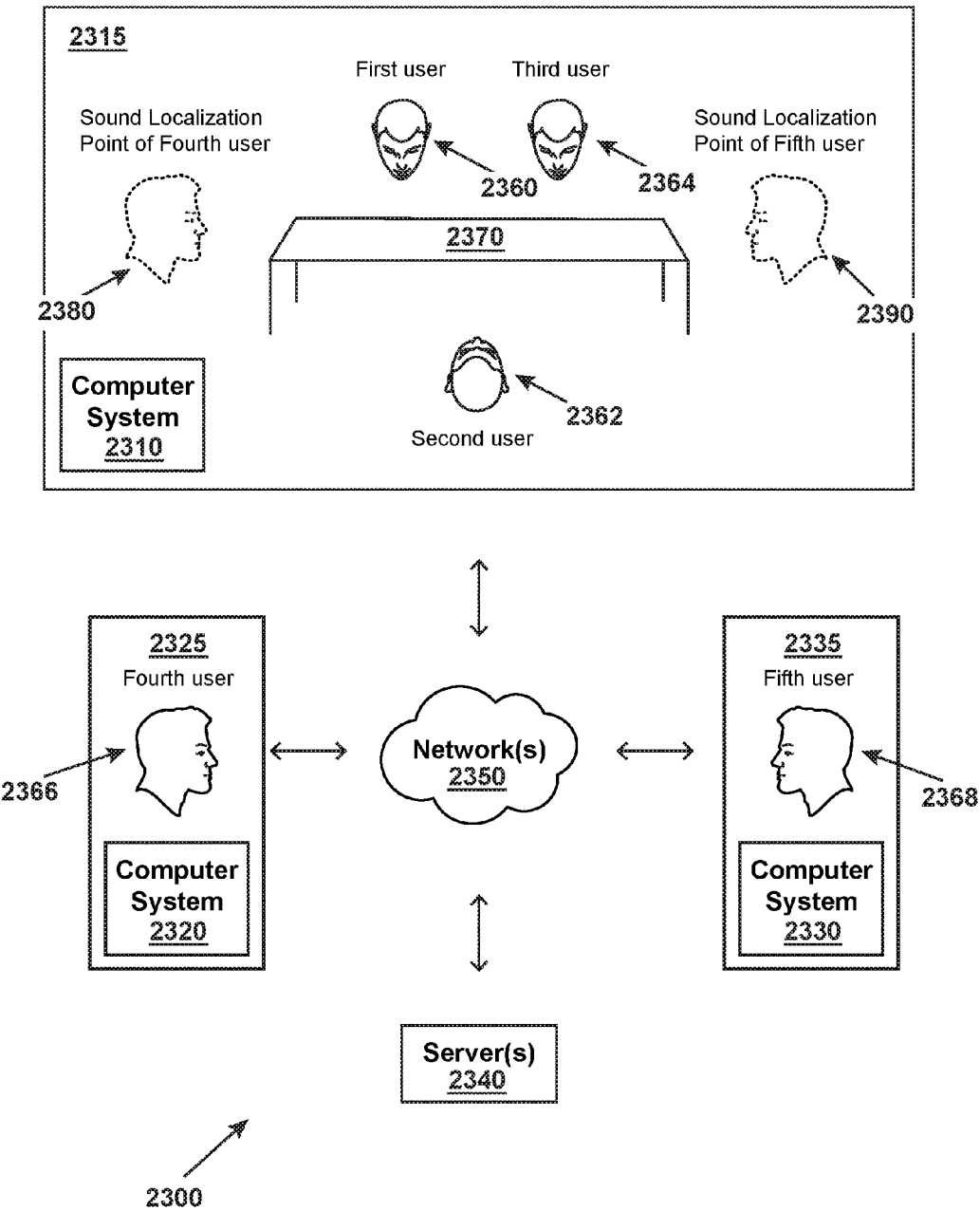
FIG. 23 is an electronic system in which electronic devices of multiple individuals communicate during an electronic call in accordance with an example embodiment.

FIG. 23 is an electronic system 2300 that includes a computer system 2310 at a first location 2315 that communicates with a remote computer system 2320 at a second location 2325 and a remote computer system 2330 at a third location 2335 via one or more servers 2340 and one or more networks 2350.

The first location 2315 includes a first user 2360, a second user 2362, and a third user 2364 seated at a conference table 2370. The second location 2325 is remote from the first location 2315 and the third location 2335 and includes a fourth user 2366. The third location 2335 is remote from the first location 2315 and the second location 2325 and includes a fifth user 2368.

The computer system 2310 at the first location 2315 initiates a conference call with the computer system 2320 at the second location 2325 and automatically determines a location of a sound localization point 2380 at the table 2370 for a voice of the fourth user 2366. During the conference call, another participant (i.e., the fifth user 2368) requests to join the call. The computer system 2310 at the first location 2315 communicates with the computer system 2330 at the third location 2335 and automatically determines a location of a sound localization point 2390 at the table 2370 for a voice of the fifth user 2368. The determination of where to place the sound localization points of the participants is based on determining one or more factors including, but not limited to, available or empty space around the table, a number of participants in the conference call, identities of participants in the conference call, empty seats or chairs at the table, a location of one or more of the participants, a size and/or shape of a room in which one or more of the participants are located, an age or rank or title of a participant, a previous location where a participant sat around the table, etc.

Consider an example in which the computer system identifies the fourth user 2366 as John Smith, and positions John at a head of the table 2370 since John is a president of the company hosting the conference call. Consider an example in which the computer system identifies an empty and/or occupied space and calculates distances between objects, people, SLPs, and/or VMPs at the conference table. The system determines that the fourth user 2366 should be situated at an end of the table so participants are evenly spaced around the table 2370. Consider an example in which the computer system determines locations of the participants around the table during prior conference calls and places the fourth user 2366 at the end of the table since this is where the fourth user sat on two previous conference calls while at location 2315. Consider an example in which the table has five chairs with three of these chairs being occupied by a real person (i.e., first user 2360, second user 2362, and third user 2364) and one chair being occupied by a sound localization point 2380 of a remote person (i.e., fourth user 2366). Based on this information, the computer system elects to place the sound localization point 2390 of the fifth user 2368 at the empty chair.

During the conference call, the first user 2360, the second user 2362, and the third user 2364 each localize a voice of the fourth user 2366 at the sound localization point 2380. Further, each of the first, second, and third users localize a voice of the fifth user 2368 at the sound localization point 2390. Adjustments are made to the sound for each of these users since they are located at different locations around the table with respect to the sound localization points. These adjustments include, but are not limited to, calculations for and changes to ITDs, ILDs, HRTFs, attenuation, reverberations, and other aspects of sound discussed herein. Further, these adjustments can occur based on movements to head orientation and location for each user. For instance, sound that the first user 2360 hears from the fourth user 2366 and the fifth user 2368 changes as the first user rotates his head toward the fifth user 2368 since this rotation changes a head orientation of the first user with respect to the sound localization point 2380 of the fourth user 2366 and the sound localization point 2390 of the fifth user 2368.

Consider an example in which the second user 2362 is speaking to and listening to the four others (2366 localized at 2380, 2360, 2364, and 2368 localized at 2390). In this example, however, the others are not people but computer programs with interactive audio input/output interfaces. Second user 2362 can hear the progress announced for process 2366 on his left, and he can pause, halt, and otherwise control the process by voice control, directing his voice to 2380, and likewise respectively monitoring and controlling each of the four processes by listening in their direction and speaking the voice commands back to the SLP of each. Each audio window/process could perceive when it was the one being addressed by the user 2362 by comparing the sound pressure received relative to that received at the other three process/window points and/or by monitoring the head orientation of user 2362. Computer user 2362 can hear each of his programs running in a different spot on his large desk. Further, this user can move the SLPs of a window/ process using, for example, a voice command, a mouse, a head or other body gesture, or other method while he is using them or while he is on an electronic call to the person designated at the SLP. Further yet, this user can arrange the SLPs of the window/process in any order and/or move any of them to the foreground (such as bringing the associated SLP toward him to make the sound louder), moving any of them to the background (such as bringing the SLP away from him to make the sound softer), and moving any of them to increase or decrease priority or access to resources (such as computer processing power, resolution, bandwidth, etc.). Even if the user has a single set of audio speakers, the audio from a movie being watched on screen 4 would be perceived to come from screen 4. The audio from a game being played on screen 2 would be perceived to come from screen 2. A change to any SLP position can alert the corresponding user and trigger an equivalent SLP position change. For example, during the call the first user adjusts the SLP 2390 to be directly in front of him on the table. In response to this movement, the fifth user 2368 is alerted of the change and is aware that he has been placed at the position designated by the first user.

Figure 24:
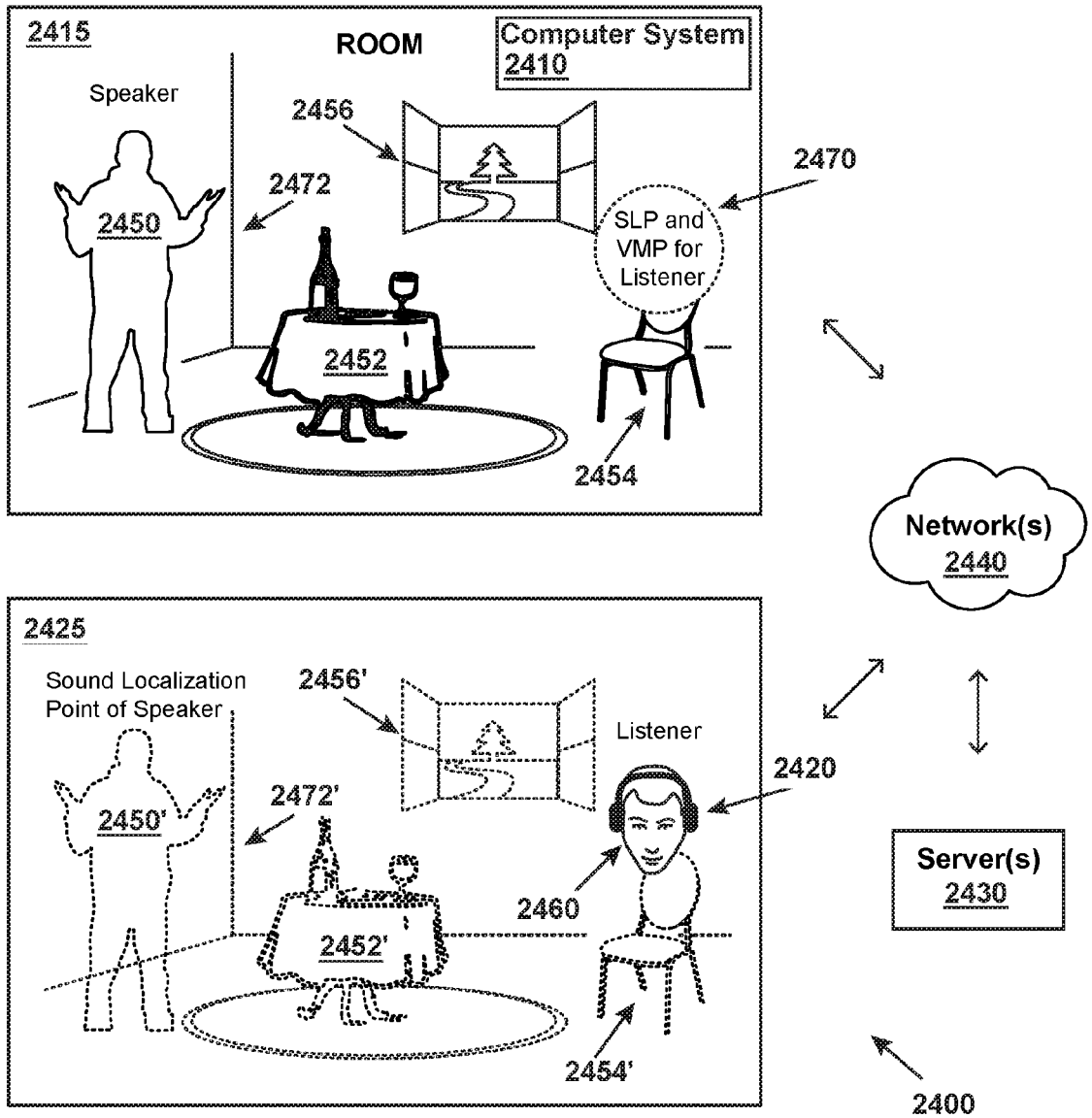
FIG. 24 is another electronic system in which electronic devices of two individuals communicate during an electronic call in accordance with an example embodiment.

FIG. 24 is an electronic system 2400 that includes a computer system 2410 at a first location 2415 that communicates with a remote wearable electronic device 2420 at a second location 2425 via one or more servers 2430 and one or more networks 2440. Location 2415 includes a room with a speaker 2450, a table 2452, a chair 2454, a window 2456, and other furnishings. Location 2415 also includes a sound localization point (SLP) and a virtual microphone point (VMP) 2470. The SLP and VMP are situated at, on, or above the empty chair 2454 that represents a location of a listener 2460 if the listener were present at the location 2415 with the speaker 2450. Location 2425 includes the listener 2460 that wears the wearable electronic device 2420.

If the listener 2460 were seated at the chair 2454 in the room at the SLP and VMP 2470, then sound impulses from the speaker 2450 would travel from the mouth of the speaker to the ears of the listener seated at the chair. These sound impulses, however, would be affected by a physical environment of the room, such as a size and a shape of the room (shown with lines 2472), objects in the room (e.g., the table 2452, the chair 2454, the window 2456, etc.), ambient conditions in the room, materials that form the walls, ceiling, and floors of the room, etc. Further, an orientation and location of the head of the speaker 2450 would also affect how these sound impulses reached the listener (such as how sound is transmitted, reflected, and absorbed).

One way to capture changes to the sound based on the physical environment of the room would be to place microphones on the chair 2454 where ears of a listener would be situated. Another way is to simulate or calculate these changes and adjust the sound so the listener hears the sound as if he were seated on the chair. These calculations can be made by knowing the physical environment of the room (such as knowing the size and shape of the room, knowing the composition and location of objects, knowing the location and orientation of the speaker, knowing the location of the VMP, knowing ambient conditions in the room, knowing materials from which the room is composed to determine a sound absorption coefficient for the material, etc.).

Consider an example in which microphones on a wearable electronic device on the speaker 2450 capture binaural sound as it leaves the mouth of the speaker. The computer system 2410 tracks a location and orientation of a head of the speaker and also retrieves or determines information relating to the physical environment of the room at location 2415. Based on this information, adjustments to the captured binaural sound are made so the sound appears to have been recorded at the chair 2454 where the VMP is located. The adjusted sound is provided to the listener 2460 at the remote location 2425. The adjusted sound includes or carries cues as to its origination, including the physical environment of the room where the speaker 2450 is located. These cues provide a three dimensional (3D) audial picture to the listener, and this audial picture includes the physical environment of the room of the speaker (e.g., the audial picture being shown as dashed lines of the speaker 2450', the table 2452', the chair 2454', the window 2456', size and shape of the room 2472' in which the speaker is located, and other objects shown with dashed lines).

Figure 25:
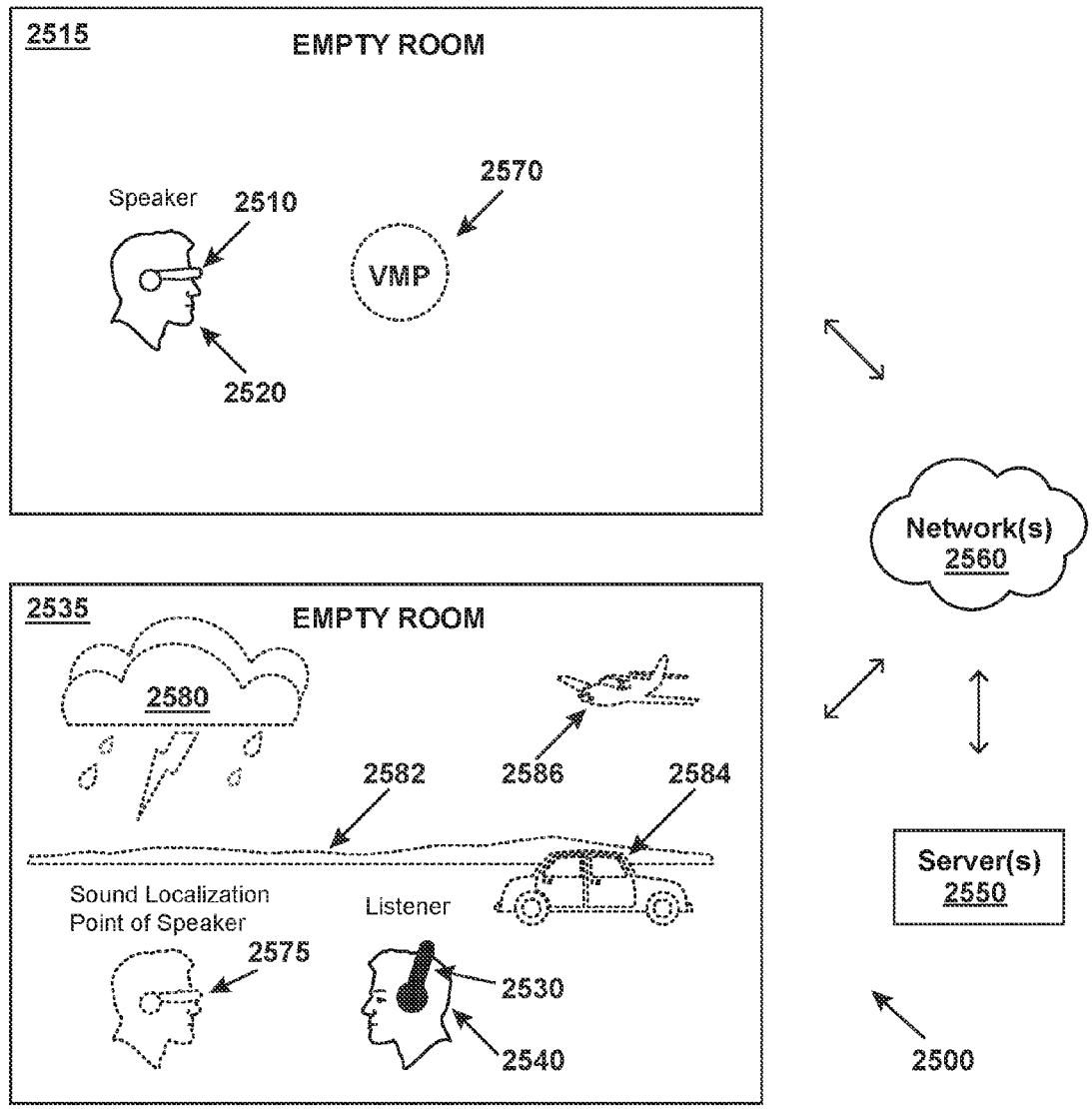
FIG. 25 is another electronic system in which electronic devices of two individuals communicate during an electronic call in accordance with an example embodiment.

FIG. 25 is an electronic system 2500 that includes a wearable electronic device 2510 at a first location 2515 (shown with a speaker 2520 in an empty room) and a wearable electronic device 2530 at a second location 2535 (shown with a listener 2540 in an empty room) that communicate via one or more servers 2550 and one or more networks 2560. Location 2515 also includes a virtual microphone point (VMP) 2570, and location 2535 includes a sound localization point 2575 where the listener 2540 localizes sounds and a voice from the speaker 2520.

Sound can be adjusted to include audial cues for an artificial 3D physical environment. These cues include changes to the sound to adjust for ambient conditions and physical objects that are not present at the location where the sound is captured. For example, the wearable electronic device 2510 captures binaural sound in an empty room from the speaker 2520. If this sound were transmitted to the wearable electronic device 2530, then the listener 2540 would hear a voice of the speaker 2520 as originating at the head of the listener 2540 since the sound was captured at the head of the speaker. The sound can be adjusted (such as changing ITDs, ILDs, and HRTFs) to move a localization point of this sound for the listener 2540 to the sound localization point 2575 that is located in front of the listener. The sound can be further adjusted to add an artificial environment where the speaker is located. These adjustments extend beyond adding artificial sound, such as background noise.

Adjustments to the sound include adding an artificial or virtual physical environment where the sound was captured. For example, the sound is adjusted to change the location of the speaker from being in an empty room to being outside on a rainy day with physical objects nearby. These adjustments are shown at location 2535 with dashed lines of an artificial physical environment that includes clouds and a thunderstorm 2580, mountains or hilly terrain 2582, a nearby automobile 2584, and an airplane 2586. These physical objects, if present at location 2515, would affect how a voice of the speaker 2520 propagated to the virtual microphone point 2570. The sound is adjusted to simulate the existence of these objects so the listener perceives or hears an artificial physical environment for the speaker.

Example embodiments include electronic devices that capture binaural sound (such as an HPED or smartphone that captures binaural sound from a talking person and delivers binaural sound to a listening person) and non-binaural sound (such as calls originating from an electronic device with monophonic or stereophonic sound).

Consider an example in which a listener wears an electronic device during a telephone call with a first speaker who is using a monophonic mobile phone. The listener is located in a quiet place, and the first speaker is in a noisy place, so the sound is localized to suit the atmosphere of the listener by filtering out the background noise. A SLP is designated to the right of the listener by adjusting an ITD by about 0.7 ms and by adjusting the ILD. At a later time in the call, the listener receives another call from a second speaker who is using an antique monophonic land-line phone. The listener admits the second speaker into the call with the first speaker so that all three can speak and hear each other. Static exists on the line with the second caller so the call is localized to match a static-free call environment of the listener and first speaker. Also, a second SLP is designated to the left of the Listener using the ITD and ILD as with the first speaker. So the listener perceives the first caller off to the right side of his face and the second caller to the left side of his face. At a later time in the call the listener receives another call from a third speaker who is using a Voice over Internet Protocol (VoIP) program running on a notebook computer equipped with one microphone. The listener admits the third speaker into the call with the listener and the first speaker and the second speaker. A third SLP is designated for the third speaker to be directly between the ears of the listener at a point inside his head. Now the listener perceives the first caller off to the right side of his face, the second caller to the left side of his face, and the third caller between the first and second callers. At a later time in the call, the listener receives another call from a fourth speaker. The listener admits the fourth speaker into the call with the listener and the other three speakers. A fourth SLP is designated for the fourth speaker at a same location with the first SLP with a same or similar ITD as the sound from the first speaker. In order to spatially distinguish the fourth speaker from the first speaker and the other speakers in the call, the ITD is gradually changed from 0.7 ms to 0 to −0.7 ms and then slowly back to 0.7 ms, repeatedly so that the listener perceives the fourth speaker to be moving slowly back and forth between the SLP of the first speaker and the SLP of the second speaker and back to the first. The ITD is incremented or decremented during times or moments when the fourth speaker is making sound, and not when he is silent. As such, whenever the fourth speaker begins to speak after a pause, he is perceived by the listener to be at the same place he was last perceived by the listener, and the listener will not perceive the fourth speaker suddenly at a SLP where he was not previously present.

Consider an example in which a listener and a talking person wear or use an electronic device that captures, transmits, and/or provides binaural sound during a telephone call. In the first part of the call, a VMP at the location of the speaker is designated to be at the point of the actual physical microphones being worn by the speaker (e.g., being at the ears of the speaker). As such, various sounds in the environment of the speaker are perceived by the listener to emanate from locations relative to the ears of the listener, and the SLP of the speaker's voice is perceived by the listener as approximately at the point of the mouth of the listener. Later in the call it is determined that the vocal part of the sound being sent by the speaker should be moved to a SLP off to the right side of the face of the listener. By way of example, the vocal part of the sound captured by the device worn by the speaker can be identified by the intersection of the set of frequencies associated with voice and with amplitudes and sound pressures matching those that likely emanated from the oral cavity a few inches away from the microphones, sounds matching a predefined voiceprint of the speaker, sounds associated with vibrations measured by a sensor mounted on or near the neck, head, or torso of the speaker, and sounds that are measured to be of near equal amplitude in both the left and right microphone sources indicating a high probability that they originated from the mouth of the speaker or directly ahead at zero degrees azimuth from the face of the speaker. The identified vocal component of the sound captured from the speaker is removed from the sound sent directly to the headphones of the listener, and the SLP of the vocal component is designated to the right side of the face of the listener using an ITD and an ILD. At this time, the listener's voice is also designated at a SLP to the left of the face of the speaker, and both the speaker and the listener have the perception that they are positioned side-by-side with the listener to the left of the speaker.

Consider an example in which a speaker wears headphones that capture and play binaural sound and include two microphones (e.g., each ear includes a microphone that wirelessly sends and receives through a binaural capable HPED). A third microphone (such as a noise-canceling microphone) captures a voice of the speaker while the two binaural microphones at the ears of the speaker capture and record sound of the environment. The voice signal captured by the third microphone is then used to assist in isolating and removing the voice component captured by the ear-mounted microphones, and also as the voice signal transmitted to the listener that may also include distance cues according the distance between the voice reference microphone and the speaker. A voice SLP can be designated as above using ITD and ILD. For example, the speaker can designate as a voice reference microphone a dedicated microphone mounted at or near the head of the speaker. A speaker can also designate the microphone in an HPED as the voice reference microphone. In this way, the speaker designates the distance of the VMP by way of designating the distance of the voice reference microphone from himself. The directional aspect of the voice SLP may be adjusted by ITD and ILD.

Isolating the vocal component of the sound captured by the speaker allows a vocal SLP to be designated to the left or to the right of the listener in the listener's frame of reference. Further, distance cues can be perceived by using a voice-sensitive microphone in an available HPED as the voice reference microphone set at a distance from the speaker. Further yet, a speaker can use four microphones to provide a clear voice signal and an improved distance-localized voice signal to the listener. A third microphone or voice reference microphone mounted near the head of the speaker aids to isolate and remove the vocal part of the sounds captured by the first and second microphones mounted at the left and right ears of the speaker as described herein. In this example, sound captured at the third microphone is not sent to the listener. Instead, a fourth microphone (such as a microphone in an HPED of a speaker) is designated to capture the voice of the speaker, including cues as to the distance between the speaker and the position of the fourth microphone. The vocal sound captured from the third microphone is used to enhance the sound captured by the fourth microphone, to isolate and cancel non-vocal components of sound, and to improve the clarity of a vocal part of the signal that is ultimately provided to the listener.

Figure 26:
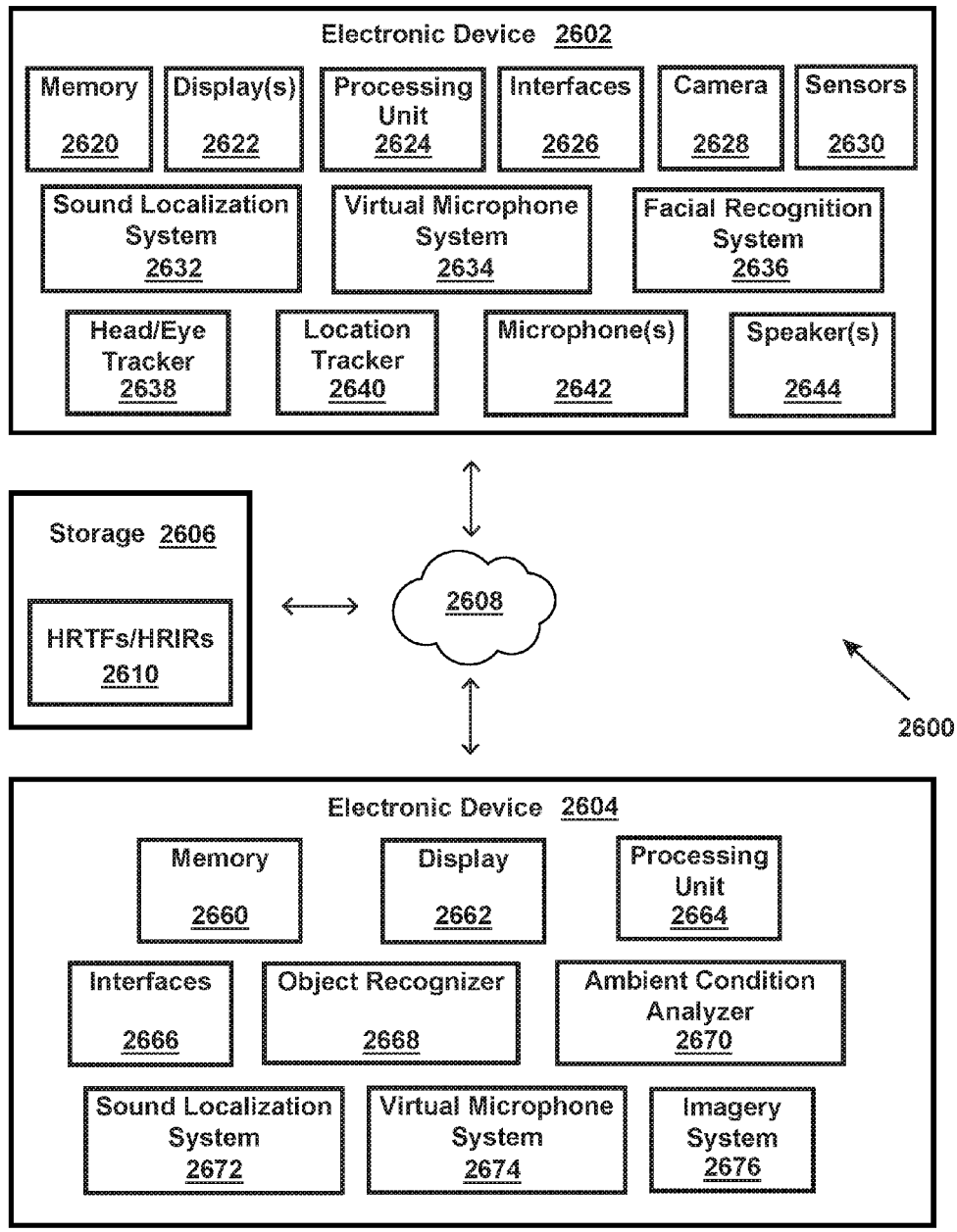
FIG. 26 is an electronic system that includes multiple electronic devices and storage in communication with each other in accordance with an example embodiment.

FIG. 26 is a computer system or electronic system 2600 that includes a computer or an electronic device 2602, a computer or electronic device 2604, and storage 2606 in communication with each other over one or more networks 2608. The storage can include memory or databases with HRTFs and/or HRIRs 2610.

By way of example, a computer and an electronic device include, but are not limited to, handheld portable electronic devices (HPEDs), wearable electronic glasses, watches, wearable electronic devices, portable electronic devices, computing devices, electronic devices with cellular or mobile phone capabilities, digital cameras, desktop computers, servers, portable computers (such as tablet and notebook computers), electronic and computer game consoles, home entertainment systems, handheld audio playing devices (example, handheld devices for downloading and playing music and videos), personal digital assistants (PDAs), combinations of these devices, devices with a processor or processing unit and a memory, and other portable and non-portable electronic devices and systems.

Electronic device 2602 includes one or more components of computer readable medium (CRM) or memory 2620, one or more displays 2622, a processing unit 2624, one or more interfaces 2626 (such as a network interface, a graphical user interface, a natural language user interface, a natural user interface, a reality user interface, a kinetic user interface, touchless user interface, an augmented reality user interface, and/or an interface that combines reality and virtuality), a camera 2628, one or more sensors 2630 (such as microelectro-mechanical systems sensor, a biometric sensor, an optical sensor, radio-frequency identification sensor, a global positioning satellite (GPS) sensor, a solid state compass, gyroscope, magnetometer, and/or an accelerometer), a sound localization system 2632 (such as a system that localizes sound, adjusts sound, predicts or extrapolates characteristics of sound, detects sound impulses using light (such as a fiber optic microphone or a laser microphone), and/or executes one or more methods discussed herein), a virtual microphone system 2634 (such as a system that captures sounds, adjusts sound, and/or executes one or more methods discussed herein), a facial recognition system 2636, a head and/or eye tracker 2638, a location or motion tracker 2640, one or more microphones 2642, and one or more speakers 2644. The sensors can further include motion detectors (such as sensors that detect motion with one or more of infrared, optics, radio frequency energy, sound, vibration, and magnetism). By way of example, the location or motion tracker includes, but is not limited to, a wireless electromagnet motion tracker, a system using active markers or passive markers, a markerless motion capture system, video tracking (e.g. using a camera), a laser, an inertial motion capture system and/or inertial sensors, facial motion capture, a radio frequency system, an infrared motion capture system, an optical motion tracking system, an electronic tagging system, a GPS tracking system, and an object recognition system (such as using edge detection).

Electronic device 2604 includes one or more components of computer readable medium (CRM) or memory 2660, one or more displays 2662, a processing unit 2664, one or more interfaces 2666, an object recognizer 2668, an ambient condition analyzer 2670, a sound localization system 2672 (such as a system that localizes sound, adjusts sound, and/or executes one or more methods discussed herein), a virtual microphone system 2674 (such as a system that captures sounds, adjusts sound, predicts or extrapolates characteristics of sound, detects sound impulses using light, and/or executes one or more methods discussed herein), and an imagery system 2676 (such as an optical projection system, a virtual image display system, virtual augmented reality system, and/or a spatial augmented reality system). By way of example, the virtual augmented reality system uses one or more of image registration, computer vision, and/or video tracking to supplement and/or change real objects and/or a view of the physical, real world.

FIG. 26 shows example electronic devices with various components. One or more of these components can be distributed or included in various electronic devices, such as some components being included in an HPED, some components being included in a server, some components being included in storage accessible over the Internet, some components being in an imagery system, some components being in wearable electronic devices, and some components being in various different electronic devices that are spread across a network or a cloud, etc.

The processor unit includes a processor (such as a central processing unit, CPU, microprocessor, application-specific integrated circuit (ASIC), etc.) for controlling the overall operation of memory (such as random access memory (RAM) for temporary data storage, read only memory (ROM) for permanent data storage, and firmware). The processing unit communicates with memory and performs operations and tasks that implement one or more blocks of the flow diagrams discussed herein. The memory, for example, stores applications, data, programs, algorithms (including software to implement or assist in implementing example embodiments) and other data.

Blocks and/or methods discussed herein can be executed and/or made by a user, a user agent of a user, a software application, an electronic device, a computer, a computer system, and/or an intelligent personal assistant.

As used herein, "empty space" is a point or a location that is not filled or occupied. For example, a location where a human would sit in an empty chair includes an empty space since this location is not filled or occupied.

As used herein, "sound localization" is a process of determining a location, an origin, or a place of emanation of sound.

As used herein, "sound localization point" is a particular location or position that is determined to be a location, an origin, or a place of emanation of sound.

As used herein, "virtual microphone point" is a virtual location or virtual position where sound is captured, recorded, or monitored.

As used herein, a "wearable electronic device" is a portable electronic device that is worn on or attached to a person. Examples of such devices include, but are not limited to, electronic watches, electronic necklaces, electronic clothing, head-mounted displays, electronic eyeglasses or eye wear (such as glasses in which augmented reality imagery is projected through or reflected off a surface of a lens), electronic contact lenses (such as bionic contact lenses that enable augmented reality imagery), an eyetap, handheld displays that affix to a hand or wrist or arm (such as a handheld display with augmented reality imagery), and HPEDs that attach to or affix to a person.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method executed by a smartphone that provides a voice of a person during a telephone call to a user of the smartphone in binaural sound, the method comprising:
   storing, in a memory of the smartphone, head-related transfer functions (HRTFs) that are user-specific to an anatomy of the user of the smartphone;
   receiving, at a network interface of the smartphone and during the telephone call between the person and the user, a wireless transmission that includes the voice of the person in mono sound;
   processing, with a digital signal processor (DSP) in the smartphone, the voice of the person in mono sound with a pair of the HRTFs to change the voice into the binaural sound so the voice of the person in the binaural sound externally localizes at a sound localization point (SLP) that is in empty space one meter away from a head of the user;
   tracking, with at least one of an accelerometer, gyroscope, and magnetometer in the smartphone, head movements of the head of the user during the telephone call;
   selecting, with a processor in the smartphone during the telephone call, different pairs of the HRTFs based on the head movements of the head of the user tracked with the at least one of the accelerometer, the gyroscope, and the magnetometer;
   processing, with the DSP in the smartphone, the voice of the person in mono sound with the different pairs of the HRTFs so the voice of the person continues to localize at a fixed location at the SLP that is in empty space one meter away from the head of the user while the head of the user moves during the telephone call;
   playing, through earphones or headphones in communication with the smartphone, the voice of the person in the binaural sound so the voice of the person continues to localize at the fixed location at the SLP that is in empty space one meter away from the head of the user while the head of the user moves during the telephone call;
   displaying, with a display of the smartphone and at the SLP that is in empty space one meter away from the head of the user, an image that represents the person with whom the user is talking during the telephone call; and
   receiving, at the smartphone during the telephone call, a command from the user to move the SLP and the image to another location that is in empty space one meter away from the head of the user.

2. The method of claim 1, wherein the fixed location at the SLP that is in empty space is above an empty chair in a room where the user is located while the user talks to the person who is located at another geographical location.

3. A method executed by a smartphone that provides a voice of a person during a telephone call to a user of the smartphone in binaural sound, the method comprising:
   storing, in a memory of the smartphone, head-related transfer functions (HRTFs) that are user-specific to an anatomy of the user of the smartphone;
   receiving, at a network interface of the smartphone and during the telephone call between the person and the user, a wireless transmission that includes the voice of the person in mono sound;
   processing, with a digital signal processor (DSP) in the smartphone, the voice of the person in mono sound with a pair of the HRTFs to change the voice into the binaural sound so the voice of the person in the binaural sound externally localizes at a sound localization point (SLP) that is in empty space one meter away from a head of the user;
   tracking, with at least one of an accelerometer, gyroscope, and magnetometer in the smartphone, head movements of the head of the user during the telephone call;
   selecting, with a processor in the smartphone during the telephone call, different pairs of the HRTFs based on the head movements of the head of the user tracked with the at least one of the accelerometer, the gyroscope, and the magnetometer;
   processing, with the DSP in the smartphone, the voice of the person in mono sound with the different pairs of the HRTFs so the voice of the person continues to localize at a fixed location at the SLP that is in empty space one meter away from the head of the user while the head of the user moves during the telephone call;
   playing, through earphones or headphones in communication with the smartphone, the voice of the person in the binaural sound so the voice of the person continues to localize at the fixed location at the SLP that is in empty space one meter away from the head of the user while the head of the user moves during the telephone call;
   receiving, at a natural language user interface of the smartphone during the telephone call, a voice command from the user to change the voice of the person from externally localizing as the binaural sound to internally localizing as the mono sound; and
   playing, through the earphones or the headphones in wireless communication with the smartphone, the voice of the person in the mono sound in response to receiving the voice command during the telephone call to change the voice of the person from externally localizing as the binaural sound to internally localizing as the mono sound.

4. The method of claim 1 further comprising:
   receiving, at a user interface of the smartphone during the telephone call, a voice command from the user to move the SLP to another fixed location that is in empty space one meter away from the head of the user; and
   playing, through the earphones or the headphones in wireless communication with the smartphone, the voice of the person to externally localize to the user at the another fixed location that is in empty space one meter away from the head of the user in response to receiving the voice command during the telephone call.

5. The method of claim 1, wherein the different pairs of the HRTFs are selected in real-time as the head of the user moves with respect to the SLP so the voice of the person continues to localize at the fixed location at the SLP, a loudness of the voice of the person increases as the user moves closer to the SLP, and the loudness of the voice of the person decreases as the user moves away from the SLP.

6. The method of claim 1 further comprising:
designating, with the smartphone, a virtual microphone point that to be at the SLP where the voice of the person externally localizes to the user.

7. The method of claim 1, further comprising:
displaying, with the display of the smartphone and on a physical empty chair in front of the user, the image that represents the person with whom the user is talking during the telephone call, wherein the image that represents the person exists at the SLP that is in empty space one meter away from the head of the user.

8. A non-transitory computer readable storage medium storing instructions that a smartphone executes to provide a voice of a person as binaural sound to a user of the smartphone during a Voice over Internet Protocol (VoIP) call between the user and the person, the method comprising:
retrieving head-related transfer functions (HRTFs) that are customized to the user and that are stored in memory of the smartphone;
processing, with a digital signal processor (DSP) in the smartphone and during the VoIP call, the voice of the person in mono sound with the HRTFs to change the voice from the mono sound into the binaural sound so the voice of the person externally localizes at a sound localization point (SLP) that is in empty space one meter away from a head of the user;
tracking, with the smartphone, head movements of the head of the user with respect to the SLP during the VoIP call;
selecting, with the smartphone and based on the head movements with respect to the SLP during the VoIP call, different ones of the HRTFs to process the voice of the person;
processing, with the DSP in the smartphone, the voice of the person in the mono sound with the different ones of the HRTFs to change the voice from the mono sound into the binaural sound so the voice of the person continues to externally localize at the SLP that is in empty space one meter away from the head of the user as the head of the user moves with respect to the SLP during the VoIP call;
providing, through earphones or headphones in communication with the smartphone, the voice of the person in the binaural sound so the voice of the person continues to externally localize at the SLP that is in empty space one meter away from the head of the user as the head of the user moves with respect to the SLP during the VoIP call; and
receiving, at an interface of the smartphone, a voice command to move the voice of the person from externally localizing at the fixed location at the SLP to internally localizing inside the head of the user in the mono sound or the stereo sound.

9. The non-transitory computer readable storage medium storing instructions of claim 8 that further cause the smartphone to execute the method comprising:
designating the SLP at coordinate locations received from a smartphone of the person.

10. The non-transitory computer readable storage medium storing instructions of claim 8, wherein the SLP is located at a static location in a virtual room where the user talks to the person, and the voice of the person continues to localize to the user from the static location at the SLP as the user moves in the virtual room with respect to the SLP during the VoIP call.

11. The non-transitory computer readable storage medium storing instructions of claim 8 that further cause the smartphone to execute the method comprising:
displaying, with a display of the smartphone and during the VoIP call, an image that represents the person at a location of the SLP such that the voice of the person originates from the SLP and the image that represents the person; and
moving, during the VoIP call and in response to receiving a command from the user, the location of the SLP from a left side of the head of the user to a SLP located at a right side of the head of the user that is in empty space one meter away from the head of the user.

12. The non-transitory computer readable storage medium storing instructions of claim 8 that further cause the smartphone to execute the method comprising:
displaying, with a display of the smartphone, an image representing the person at a location in a computer-generated room that corresponds to the SLP so that the voice of the person originates from the image representing the person; and
maintaining the SLP at a fixed position in the computer-generated room while the user moves in the computer-generated room with respect to the SLP and while the head of the user rotates with respect to the SLP.

13. The non-transitory computer readable storage medium storing instructions of claim 8 that further cause the smartphone to execute the method comprising:
adjusting, the different ones of the HRTFs processing the voice of the person, in real-time as the head of the user moves in order to maintain the SLP at a static location in a physical room of the user.

14. The non-transitory computer readable storage medium storing instructions of claim 8 that further cause the smartphone to execute the method comprising:
capturing, with a camera, a picture of a face of the user;
comparing a size and a shape of the face of the user with sizes and shapes of faces of individuals with known HRTFs;
determining, based on the comparing, a match between the size and the shape of the face of the user with one of the individuals with the known HRTFs; and
selecting the HRTFs based on the match between the size and the shape of the face of the user with one of the individuals with the known HRTFs.

15. The non-transitory computer readable storage medium storing instructions of claim 8 that further cause the smartphone to execute the method comprising:
designating a virtual microphone point at the SLP;
determining, with the smartphone, a distance and a head orientation of the user with respect to a location of the virtual microphone point; and
increasing a volume of the voice of the user that the person hears as the user moves closer to the virtual microphone point.

16. A smartphone that provides a voice of a person during a telephone call to a user of the smartphone in binaural sound, the smartphone comprising:
a memory that stores head-related transfer functions (HRTFs) that are specific to an anatomy of the user of the smartphone;

a network interface that wirelessly receives the voice of the person in mono sound or stereo sound;

a digital signal processor (DSP) that processes, during the telephone call, the voice of the person in the mono sound or the stereo sound with the HRTFs to change the voice into the binaural sound so the voice of the person in the binaural sound externally localizes at a sound localization point (SLP) that is in empty space one meter away from a head of the user;

one or more of an accelerometer, a gyroscope, and a magnetometer that track head movements of the head of the user with respect to the SLP during the telephone call;

a processor that communicates with the one or more of the accelerometer, the gyroscope, and the magnetometer to select different ones of the HRTFs with which the DSP processes with the voice of the person in the mono sound or the stereo sound so the voice of the person in the binaural sound continues to externally localize at a fixed location at the SLP that is in empty space one meter away from the head of the user while the head of the user moves with respect to the SLP during the telephone call; and an interface that receives a voice command to move the voice of the person from externally localizing at the fixed location at the SLP to internally localizing inside the head of the user in the mono sound or the stereo sound, wherein the DSP in the smartphone processes the voice of the person in the mono sound or the stereo sound with the different pairs of the HRTFs so the voice of the person continues to externally localize at the fixed location at the SLP that is in empty space one meter away from the head of the user while the head of the user moves with respect to the SLP during the telephone call, and wherein the smartphone provides the voice of the person to one of earphones or headphones in communication with the smartphone so the voice of the person continues to externally localize at the fixed location at the SLP that is in empty space one meter away from the head of the user while the head of the user moves with respect to the SLP during the telephone call.

17. The smartphone of claim 16 further comprising:

a display that displays, to the user during the telephone call, a virtual image of the person at the fixed location at the SLP that is in empty space one meter away from the head of the user, wherein the voice of the person and the virtual image continue to exist at the fixed location at the SLP while the head of the user rotates with respect to the SLP and the virtual image during the telephone call.

18. The smartphone of claim 16, wherein the smartphone selects a location of the SLP based on previous locations of an SLP where the person was with respect to the user while the user was being tracked.

* * * * *